United States Patent [19]

Raphaeli

[11] Patent Number: 6,064,695
[45] Date of Patent: May 16, 2000

[54] SPREAD SPECTRUM COMMUNICATION SYSTEM UTILIZING DIFFERENTIAL CODE SHIFT KEYING

[75] Inventor: Dan Raphaeli, Tel Aviv, Israel

[73] Assignee: Itran Communications Ltd., Beer Sheva, Israel

[21] Appl. No.: 08/879,522

[22] Filed: Jun. 20, 1997

[51] Int. Cl.[7] ...................................................... A61F 2/06
[52] U.S. Cl. ........................ 375/230; 375/135; 375/136; 375/141
[58] Field of Search ..................................... 375/200, 204, 375/205, 206, 209, 259, 295, 316, 244, 283, 330; 370/300, 335, 342, 441, 479, 282, 284

[56] References Cited

U.S. PATENT DOCUMENTS

| | | |
|---|---|---|
| 3,934,203 | 1/1976 | Schiff . |
| 4,477,912 | 10/1984 | Russell . |
| 5,090,024 | 2/1992 | Vander Mey et al. . |
| 5,155,741 | 10/1992 | Waters et al. . |
| 5,179,572 | 1/1993 | Schilling ................................. 375/200 |
| 5,237,587 | 8/1993 | Schoolcraft ............................ 375/206 |
| 5,253,268 | 10/1993 | Omura et al. ......................... 375/206 |
| 5,263,046 | 11/1993 | Vander Mey . |
| 5,278,862 | 1/1994 | Vander mey . |
| 5,359,625 | 10/1994 | Vander Mey et al. . |
| 5,574,748 | 11/1996 | Vander Mey et al. . |
| 5,671,247 | 9/1997 | Souissi et al. ........................ 375/200 |
| 5,748,669 | 5/1998 | Yada ...................................... 375/202 |
| 5,768,307 | 6/1998 | Schramm et al. ..................... 375/208 |

*Primary Examiner*—Tesfaldet Bocure
*Assistant Examiner*—Bayard Emmanuel
*Attorney, Agent, or Firm*—Darby & Darby; Howard Zaretsky

[57] ABSTRACT

A spread spectrum data communication system utilizing a modulation technique referred to as differential code shift keying (DCSK) transmits data in the form of time shifts between consecutive circularly rotated waveforms of length T known as spreading waveforms. A plurality of bits are transmitted during each symbol period which is divided into a plurality of shift indexes with each shift index representing a particular bit pattern. The spreading waveform is rotated by an amount in accordance with the data to be transmitted or is conveyed in the difference between two consecutive rotations. A correlator employing a matched filter having a template of the chirp waveform pattern is used to detect the amount of rotation of the chirp within the received signal for each symbol. The received data is fed into a shift register and circularly rotated. For each rotation shift, the matched filter generates a correlation sum. The shift index chosen for each symbol corresponds to the shift index that yields the maximum correlation sum. Differential shift indexes are generated by subtracting the currently received shift index from the previously received shift index. The differential shift index is then decoded to yield the originally transmitted data.

55 Claims, 19 Drawing Sheets

SYMBOL STREAM

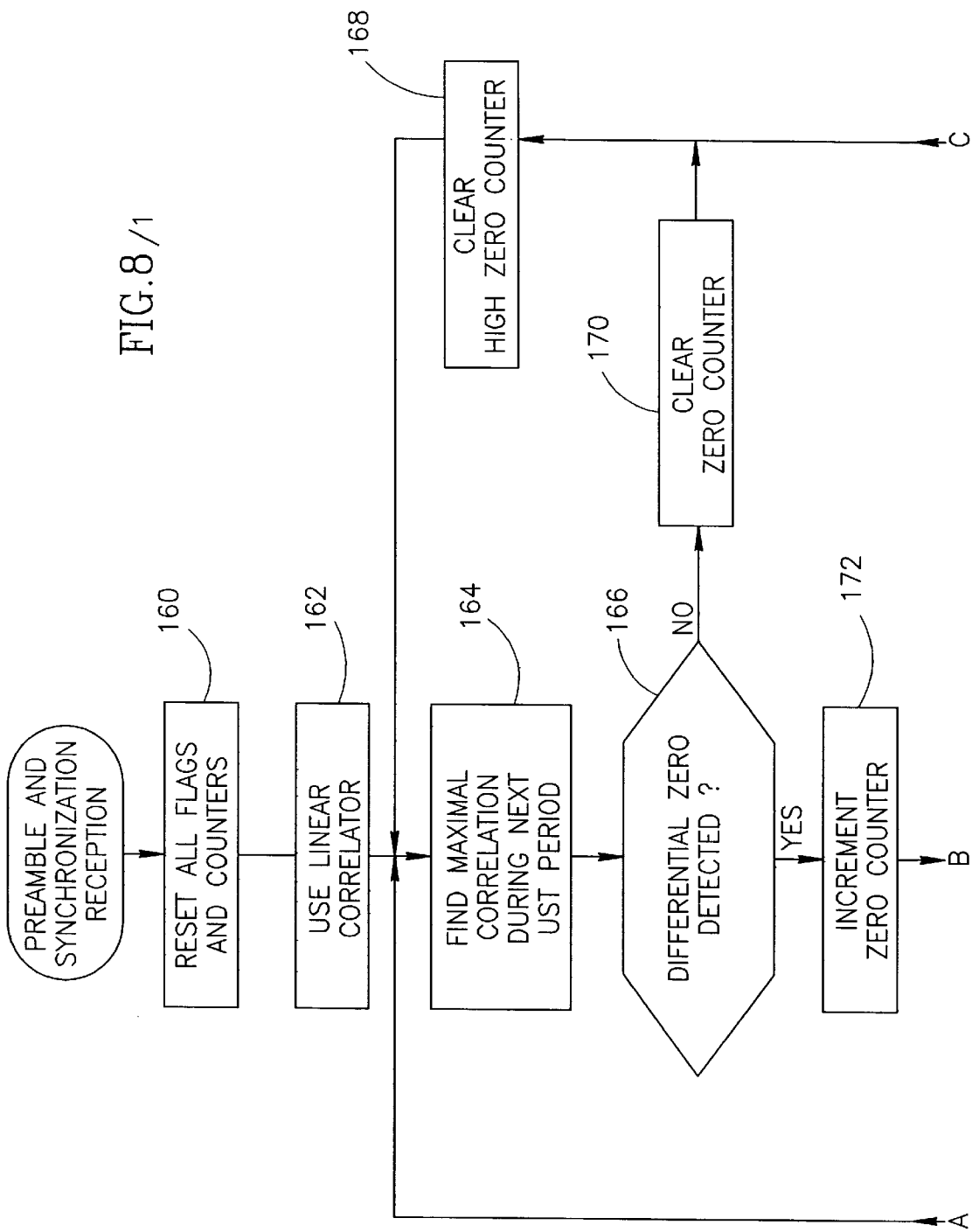
FIG. 8/1

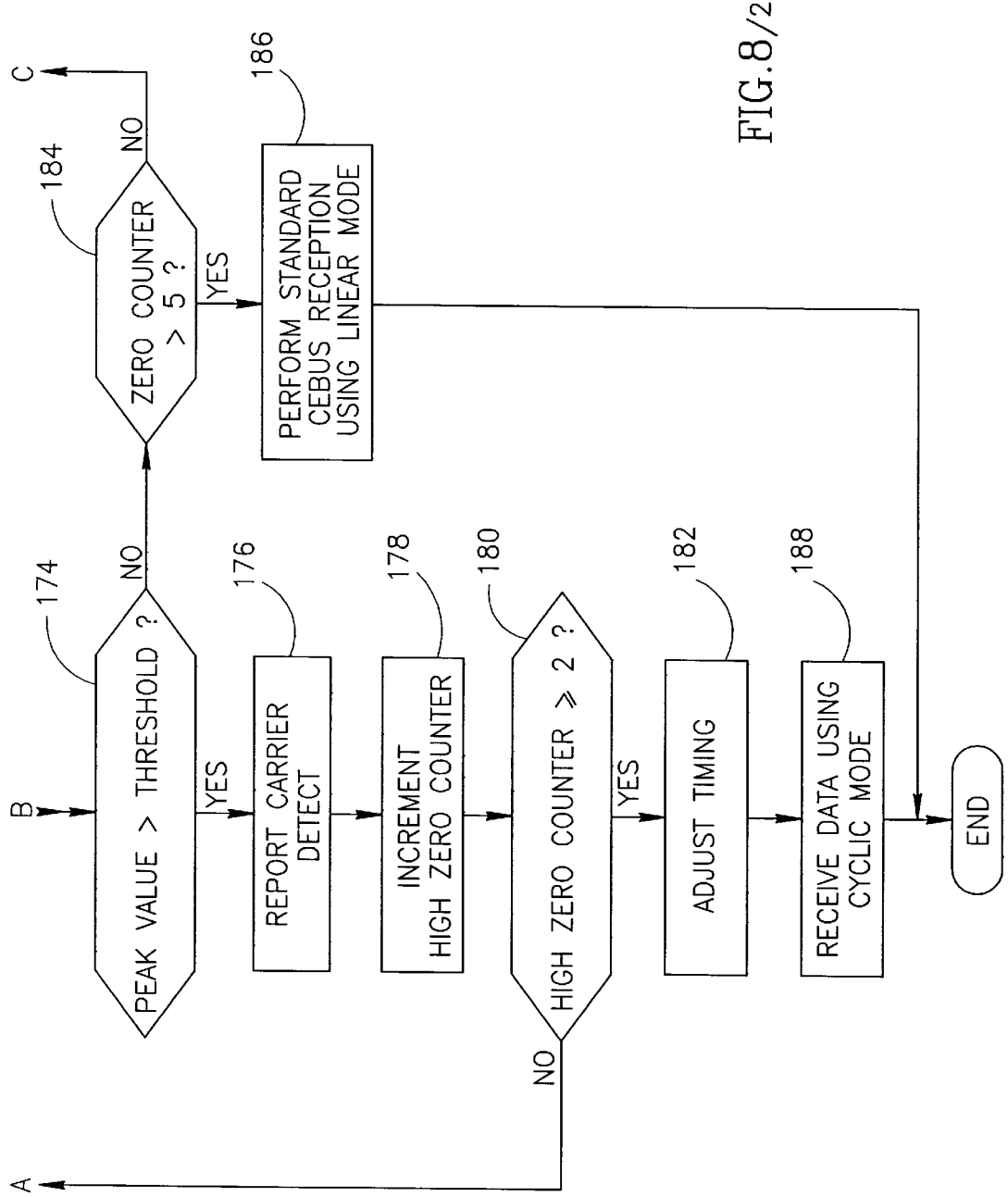
FIG.8/2

SPREAD SPECTRUM COMMUNICATION SYSTEM UTILIZING DIFFERENTIAL CODE SHIFT KEYING

FIELD OF THE INVENTION

The present invention relates generally to data communication systems and more particularly relates to a spread spectrum communications system that utilizes differential code shift keying to transmit and receive data.

BACKGROUND OF THE INVENTION

The use of spread spectrum communications techniques to improve the reliability and security of communications is well known and is becoming more and more common. Spread spectrum communications transmits data utilizing a spectrum bandwidth that is much greater than the bandwidth of the data to be transmitted. This provides for more reliable communication in the presence of high narrowband noise, spectral distortion and pulse noise, in addition to other advantages. Spread spectrum communication systems typically utilize correlation techniques to identify an incoming signal.

Spread spectrum communications systems are commonly used in military environments to overcome high energy narrowband enemy jamming. In commercial or home environments it may be used to achieve reliable communication on noisy media such as the AC powerline. In particular, certain home electrical appliances and devices can potentially be very disruptive of communications signals placed onto the powerline. For example, electronic dimming devices can place large amounts of noise onto the powerline since these devices typically employ triacs or silicon controlled rectifiers (SCRs) to control the AC waveform in implementing the dimming function.

A communication medium such as the AC powerline may be corrupted by fast fading, unpredictable amplitude and phase distortion and additive noise. In addition, communication channels may be subjected to unpredictable time varying jamming and narrowband interference. In order to transmit digital data over such channels it is preferable to use as wide a bandwidth as possible for transmission of the data. This can be achieved using spread spectrum techniques.

One common type of spread spectrum communications, called direct sequence spread spectrum, is generated by first modulating the digital data and then multiplying the result with a signal having particularly desirable spectral properties, such as a PN sequence. The PN sequence is a periodic sequence of bits having a period N. Each bit in the sequence is termed a chip. The sequence has the property of having very low autocorrelation for delays larger than one chip. In some systems, the PN sequence is replaced by a chirp waveform.

The spread spectrum receiver is required to perform synchronization which is commonly implemented using an acquisition method in combination with a tracking loop or other tracking mechanism. In a noisy unpredictable environment such as the AC powerline, the tracking loop typically fails frequently causing loss of information. Communication systems to overcome these problems are large, complex and expensive. In addition, these systems typically succeed at transmitting only one or two bits per symbol.

SUMMARY OF THE INVENTION

The present invention is a spread spectrum data communication system that utilizes a modulation technique referred to as differential code shift keying (DCSK) to increase the number of bits transmitted per symbol, decrease synchronization requirements and to improve performance. The data is transmitted in the form of time shifts between consecutive circularly rotated waveforms of length T which are referred to as spreading waveforms. The spreading waveforms can comprise any type of waveform that has suitable auto correlation properties. In the example presented herein, standard CEBus chirps can be used as the spreading waveform in order to permit the coexistence of standard CEBus transmissions and transmissions generated by the communication system of the present invention.

During each symbol period which is also referred to as a unit symbol time (UST, a plurality of bits are transmitted. The symbol period is divided into a plurality of shift indexes with each shift index representing a particular bit pattern. The waveform is rotated by an amount in accordance with the data to be transmitted. The data is conveyed in the amount of rotation applied to the chirp before it is transmitted. Alternatively, the data may be conveyed in the shift differential between consecutive symbols. A correlator is used to decode the received waveform. The correlator employs a matched filter having a template of the chirp waveforn pattern to detect the amount of rotation of the chirp within the received signal for each symbol. The received data is fed into a shift register and circularly rotated. For each rotation shift, the matched filter generates a correlation sum. The shift index chosen for each UST corresponds to the shift index that yields the maximum (or minimum) correlation sum. Differential shift indexes are generated by subtracting the currently received shift index from the previously received shift index. The differential shift index is then decoded to yield the originally transmitted data.

The transmitter sends data in the form of packets to the receiver. A start of packet field is placed at the beginning of the packet. The receiver searches for a correlation peak over all the possible shifts of each symbol received using linear correlation. Once the start of packet field is detected the receiver searches for two consecutive zeros. Synchronization is achieved when two consecutive zeros are received within the start of packet field. Once synchronization is achieved, cyclic correlation is used to receive the remainder of the packet. The differential data sent by the transmitter is encoded in the shift distance computed between two consecutive symbols. A differentiator in the receiver generates differential data. Subsequently integrating the differential data helps to prevent double error effects.

The present invention discloses two embodiments termed the fast embodiment and the high reliability embodiment. When used with standard 100 microsecond CEBus chirps, the fast embodiment is capable of a data transmission rate of up to approximately 50 Kbps. The reliable embodiment utilizes longer spreading waveform lengths to increase transmission reliability. In addition, the receiver divides the input signal into two or more separate frequency bands. Each band receiving and generating a correlation sum. The results of the correlation for each band are combined and a maximal correlation shift index is determined. In the example presented herein, the reliable embodiment constructs a symbol, termed a superchirp which is 800 microseconds long, from eight individual 100 microsecond chirps. The entire superchirp is then circularly shifted in accordance with the data to be transmitted. A correlator in the receiver having a template of the superchirp pattern is used to detect and decode superchirps from the received signal.

The spread spectrum communication system of the present invention has the advantages of higher reliability of transmission, simple and fast synchronization and immediate recovery from severe fading. In addition, a plurality of bits can be sent per symbol, permitting either a longer time duration for each symbol or a higher data throughput rate using the same symbol time duration as in typical direct sequence spread spectrum communications systems. Another advantage of the system is that is provides robustness against channels characterized by frequency varying signal to noise ratios. Further, the present invention can be implemented in low cost such as in a single VLSI integrated circuit.

There is therefore provided in accordance with the present invention a method of communicating over a communications channel from a transmitter to a receiver both connected to the communications channel, the method comprising the steps of generating a plurality of symbols at the transmitter, each symbol constructed utilizing a spreading waveform circularly shifted by an amount in accordance with the data to transmitted within the symbol, placing the plurality of symbols onto the communications channel, receiving a signal from the communication channel at the receiver, and decoding the plurality of symbols at the receiver by correlating the received signal with a template corresponding to the spreading waveform.

There is also provided in accordance with the present invention a method of communicating over a communications channel from a transmitter to a receiver both connected to the communications channel, the method comprising the steps of generating a plurality of symbols at the transmitter, the symbol constructed utilizing a spreading waveform circularly shifted by an amount in accordance with the data to transmitted within the symbol, placing the plurality of symbols onto the communications channel, receiving a signal from the communication channel at the receiver, and decoding the plurality of symbols at the receiver by correlating the received signal with a template corresponding to the spreading waveform to generate a differential shift index representing the time shift between consecutive circular shifts of the spreading waveform.

The spreading waveform may comprise a chirp waveform or a superchirp waveform constructed from a plurality of individual chirps. Further, the step of decoding comprises the steps of circularly shifting each received symbol a total amount equal to the length of one symbol, for each circular shift of the received symbol, correlating the received symbol with the template corresponding to the spreading waveform, generating a shift index corresponding to a maximum correlation sum, and decoding the shift index to yield the original transmitted data.

The step of decoding may also comprise the steps of circularly shifting each received symbol a total amount equal to the length of one symbol, for each circular shift of the received symbol, correlating the received symbol with the template corresponding to the spreading waveform, generating a first shift index and a negative shift index corresponding to a positive correlation sum and a negative correlation sum, respectively, decoding the first shift index and the second shift index to yield a first data output and a second data output, respectively, and outputting either the first shift index or the second shift index based on a maximum of the positive correlation sum and the negative correlation sum.

In addition, there is provided in accordance with the present invention a spread spectrum communications system for communication over a communication channel, comprising a transmitter coupled to the communication channel, the transmitter for generating a plurality of symbols, each symbol constructed utilizing a spreading waveform circularly shifted by an amount in accordance with the data to transmitted within the symbol, and a receiver coupled to the communication channel, the receiver for receiving a signal from the communications channel and for decoding the plurality of symbols by correlating the received signal with a template corresponding to the spreading waveform.

There is also provided in accordance with the present invention a method of generating a signal for transmission over a communications channel from an input bit stream and utilizing a spreading waveform, the method comprising the steps of forming a serial stream of shift indexes from tire input bit stream, determining an initial index in accordance with each shift index within the serial stream of shift indexes, circularly shifting the spreading waveform in accordance with the initial index, and transmitting the circularly shifted spreading waveform onto the communication channel.

Further, there is provided in accordance with the present invention a method of generating a spread spectrum signal for transmission over a communications channel from an input bit stream and utilizing a spreading waveform, the method comprising the steps of forming a shift index from the input bit stream, determining an initial index in accordance with the following equation:

$$\text{initial index} = \left[\frac{\text{spreading waveform length}}{\text{total number of symbols}}\right] \cdot \text{shift index},$$

circularly shifting the spreading waveform in accordance with the initial index, and transmitting the circularly shifted spreading waveform onto the communication channel. The method further comprises the step of differentiating the input bit stream to yield a differential shift index.

In addition, there is provided in accordance with the present invention a transmitter for generating a signal for transmission over a communications channel from an input bit stream and utilizing a spreading waveform, comprising means for forming a shift index from each group of n bits in the input bit stream, means for determining an initial index in accordance with the shift index, means for circularly shifting the spreading waveform in accordance with the initial index, and means for providing the circularly shifted spreading waveform to the communication channel.

The means for circularly shifting the spreading waveform comprises counting means adapted to receive the initial index, and look up table means for outputting sample points of the spreading waveform corresponding to the output of the counting means. The transmitter further comprises a differentiator for differentiating the input bit stream to yield a differential shift index.

There is also provided in accordance with the present invention a receiver coupled to a communications channel for receiving a plurality of symbols, each symbol consisting of a spreading waveform circularly rotated by an amount in accordance with the data to be transmitted during a particular symbol time, the receiver comprising sampling means for sampling a receive input signal, shift means for circularly rotating the output of the sampling means, the shift means having a plurality of taps, correlation means coupled to the plurality of taps of the shift means, the correlation means generating a correlation sum for each circular shift of the shift means utilizing a template corresponding to the spreading waveform, the correlation means generating a plurality of correlation sums for each received symbol, maximum correlation detection means for determining a maximum correlation sum from the plurality of correlation sums, and a data decoder for decoding a shift index associated with the maximum correlation sum and generating an output therefrom.

Further, there is therefore provided in accordance with the present invention a receiver coupled to a communications channel for receiving data encoded as a plurality of symbols, each symbol transmitted utilizing a spreading waveform, the receiver comprising signal splitting means for dividing a receive input signal into a plurality of frequency bands, the signal splitting means outputting a plurality of band pass signals, each band pass signal associated with a single frequency band, sampling means for sampling the plurality of band pass signals, correlation means for correlating the output of the sampling means for each frequency band, the correlation means generating a plurality of band correlation sums for each frequency band, sing means for summing each plurality of band correlation sums to yield a plurality of correlation sums, maximum correlation detection means for determining a maximum correlation sum from the plurality of correlation sums, and data decoding means for decoding the received symbols utilizing the maximum correlation sum and generating an output therefrom.

Also, there is provided in accordance with the present invention a receiver coupled to a communications channel for receiving data encoded as a plurality of symbols, each symbol consisting of a spreading waveform circularly rotated by an amount in accordance with the data to be transmitted during a particular symbol time, the receiver comprising signal splitting means for dividing a receive input signal into a plurality of frequency bands, the signal splitting means outputting a plurality of band pass signals, each band pass signal associated with a single frequency band, a plurality of sampling means for sampling the plurality of band pass signals, a plurality of shift means for circularly rotating the output of each sampling means associated with each frequency band, each shift means having a plurality of taps, a plurality of correlation means, each correlation means coupled to the output of one of the shift means, the correlation means generating a correlation sum for each circular shift of the shift means utilizing a template corresponding to the spreading waveform, each correlation means generating a plurality of band correlation sums for each received symbol, summing means for summing each plurality of band correlation sums output by each correlation means so as to generate a plurality of correlation sums, maximum correlation detection means for determining a maximum correlation sum from the plurality of correlation sums, and a data decoder for decoding a shift index associated with the maximum correlation sum and generating an output therefrom.

The receiver further comprises a differentiator coupled to the output of the maximum correlation detection means, the differentiator for generating a differential shift index corresponding to the time difference between two consecutive circularly rotated spreading waveforms.

The receiver further comprises an integrator coupled to the output of the data decoder, the integrator for integrating the output of the data decoder, The signal splitting means comprises a plurality of band pass filters, each band pass filter having a bandwidth and center frequency according to its frequency band. The sampling means comprises a one bit analog to digital converter or a comparator and a sample circuit. The sampling means comprises means for generating both an I or inphase data stream and a Q or quadrature data stream, wherein the Q data stream is delayed in time with respect to the I data stream by a predetermined amount.

The correlation means comprises complex correlation means. The complex correlation means comprises means for applying a non linear function to the results of the complex correlation. The non linear function comprises a squaring function.

There is also provided in accordance with the present invention a method of receiving data that is encoded as a plurality of symbols and transmitted over a communications channel, each symbol transmitted utilizing a spreading waveform, the method comprising the steps of dividing a receive input signal into a plurality of frequency bands, generating a plurality of band pass signals, each band pass signal associated with a single frequency band, sampling the plurality of band pass signals to yield a sample stream, correlating the sample stream associated with each frequency band so as to generate a plurality of band correlation sums therefrom, summing each plurality of band correlation sums so as to generate a plurality of correlation sums, determining a maximum correlation sum from the plurality of correlation sums, and decoding a shift index for each received symbol utilizing the maximum correlation sum and generating an output therefrom.

Also, there is provided in accordance with the present invention a method of receiving data encoded as a plurality of symbols and transmitted over a communication channel, each symbol consisting of a spreading waveform circularly rotated by an amount in accordance with the data to be transmitted during a particular symbol time, the method comprising the steps of dividing a receive input signal into a plurality of frequency bands, generating a plurality of band pass signals, each band pass signal associated with a single frequency band, sampling the plurality of band pass signals to yield a sample stream, circularly rotating the sample stream of each frequency band, correlating the circularly rotated sample stream for each frequency band utilizing a template corresponding to the spreading waveform, generating a band correlation sum for each circular rotation to yield a plurality of band correlation sums for each symbol, summing the plurality of band correlation sums for each frequency band so as to generate a plurality of correlation sums, determining a maximum correlation sum from the plurality of correlation sums, and decoding a shift index associated with the maximum correlation sum and generating an output therefrom.

In addition, there is provided in accordance with the present invention, in a spread spectrum communications system for communication over a communication channel, including a transmitter and a receiver both connected to the communications channel, a method for synchronizing the receiver, the method comprising the steps of transmitting a plurality of spreading waveforms, the plurality of spreading waveforms having zero differential shift with respect to each other, receiving and decoding the plurality of spreading waveforms, and achieving synchronization upon receiving a minimum of a predetermined number of spreading waveforms having zero differential shift between them. Each spreading waveform may have zero rotational shift.

BRIEF DESCRIPTION OF THE DRAWINGS

The invention is herein described, by way of example only, with reference to the accompanying drawings, wherein:

FIGS. 8 comprising FIG. 8/1 and FIG. 8/2, is a high level flow diagram illustrating the preamble and synchronization reception method of the first embodiment of the present invention;

DETAILED DESCRIPTION OF THE INVENTION

The present invention is a spread spectrum data communications system that is applicable to relatively noisy environments such as the AC powerline. Two different embodiments of the spread spectrum data communications system of the present invention are disclosed. The first embodiment, also referred to as the fast embodiment, comprises a transmitter and receiver pair capable of relatively high speed data communications. The second embodiment, also referred to as the reliable embodiment, is a transmitter and receiver pair which communicates at a lower data rate than the first embodiment but achieves a higher reliability level. Both embodiments of the present invention are particularly suitable for use in an environment comprising modems operating in accordance with the CEBus communications standard. The fast embodiment is capable of transmitting data at a rate much higher than the CEBus standard is presently capable of. The CEBus standard is defined by the Electronics Industry Association and is known as the EIA-600 standard.

Figure 1:
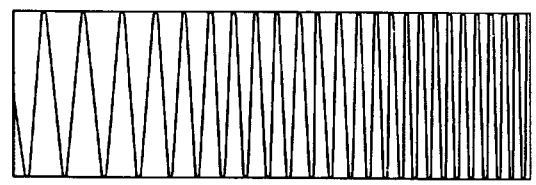
FIG. 1 is an illustration of the chirp waveform suitable for use with the spread spectrum communication systems of the present invention.

The spread spectrum system of the present invention transmits data in the form of time shifts between consecutive circularly rotated waveforms of length T which are referred to as spreading waveforms. The spreading waveforms can comprise any type of waveform that has suitable auto correlation properties. Preferably, the spreading waveform comprises a chirp waveform. An illustration of a chirp waveform, i.e., spring, waveform suitable for use with the spread spectrum communications system of the present invention is shown in FIG. 1. The spreading waveform shown in FIG. 1 spans a time duration which is termed a unit symbol time (UST). During each symbol period or UST, a plurality of bits are transmitted. The symbol period is divided into a plurality of shift indexes with each shift index representing a particular bit pattern. The spreading waveform is rotated by an amount in accordance with the data to be transmitted. The data is conveyed in the amount of rotation applied to the chirp before it is transmitted. Alternatively, the data may be conveyed in the shift differential between consecutive symbols. Typically, the chirp comprises a swept frequency signal. For example, the frequency sweep can span from 200 to 400 KHz and then from 100 KHz to 200 KHz, similar to the chirp specified in the CEBus standard. Or the chirp may comprise the swept frequency waveform shown in FIG. 1.

The spread spectrum communications system of the present invention utilizes a technique known as differential code shift keying (DCSK) to transmit data. Using this technique, the data is transmitted in the form of time shifts between consecutive circularly rotated spreading waveforms or in the shifts themselves in an absolute fashion. The spreading waveforms can comprise standard CEBus chirps in order to prevent contention in CEBus modem environments. In non CEBus environments or where interoperability with CEBus devices is not important, other spreading waveforms can be utilized with the present invention.

Figure 2:
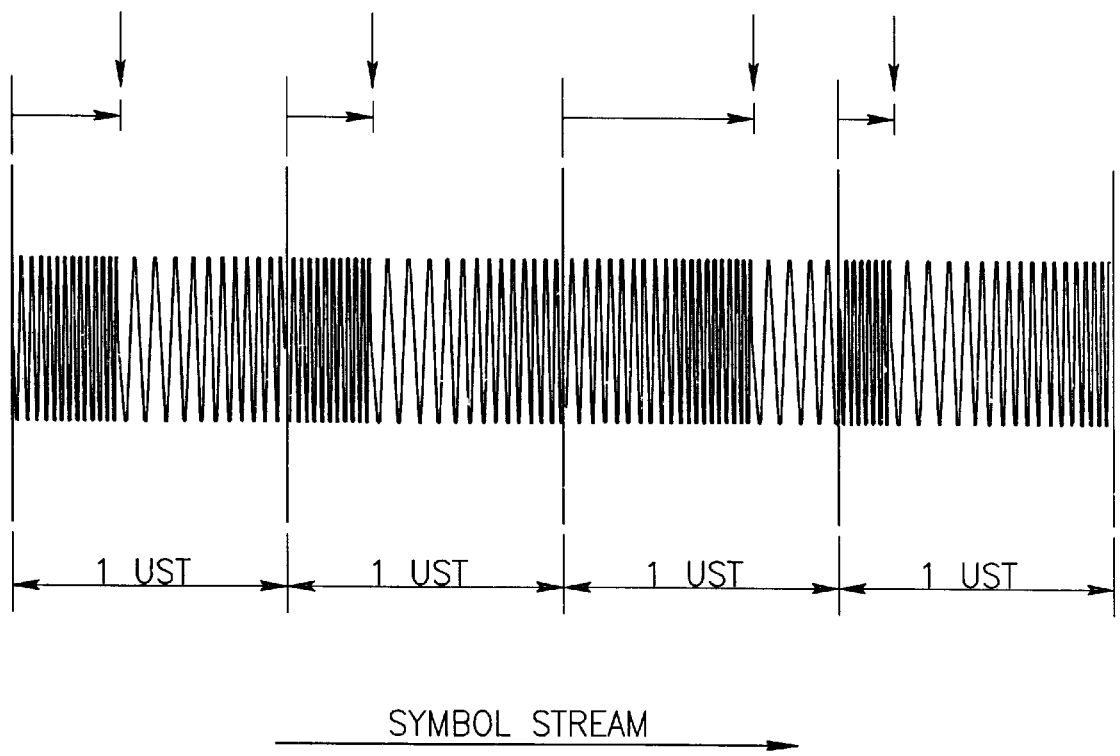
FIG. 2 is an illustration of a waveform of a sample symbol stream generated by rotating each chirp pattern by an amount representative of the data to be transmitted.

An illustration of a waveform of a sample symbol stream generated by rotating each chirp pattern by an amount representative of the data to be transmitted is shown in FIG. 2. The DCSK modulation scheme of the present invention transmits data by rotating the chirp wave form a particular amount in accordance with the data to be transmitted. Thus, during each UST the chirp begins at a point in the chirp waveform that corresponds to the data to be transmitted during that particular UST. With reference to FIG. 2, four USTs are shown making up a sample symbol stream. The data to be transmitted within each UST is conveyed in the amount of rotation applied to each chirp waveform. For example, in the first UST, the chirp waveform is rotated by a particular amount indicated by the length of the horizontal arrow. The vertical downwardly pointing arrow indicates the beginning of the original chirp waveform with no rotation applied. Within each UST the data that is to be transmitted determines the amount of rotation applied to the chirp before transmission.

The DCSK modulation method of the present invention has the advantages of being robust to synchronization errors, relatively easy to implement and yields performance close to that of error correcting code in the presence of white gaussian noise. In operation, each UST is divided into a predetermined number of shift indexes or shift locations. In the example provided herein, each UST is divided into 32 shift indexes. However, each UST can be divided into a member of shift indexes higher or lower than 32. Dividing each UST into 32 shift indexes translates to a transmission rate of five bits per symbol. A description of the fast embodiment will now be described followed by a description of the reliable embodiment.

Figure 3:
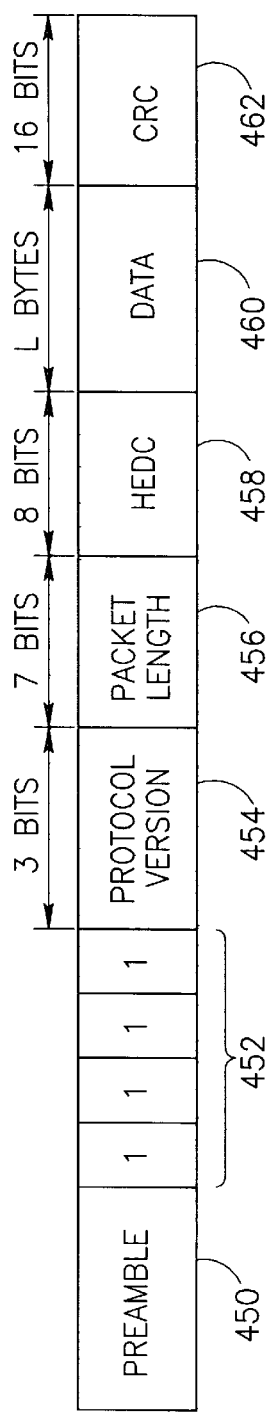
FIG. 3 illustrates the packet structure of the data communications protocol of the present invention.

The packet structure of the data communications protocol portion of the present invention is shown in FIG. 3. In general, the packet structure of the present invention comprises a preamble, a start of packet (SOP) field, au L byte data field and a cyclic redundancy check (CRC) field in similar fashion to the standard CEBus packet structure. The packet structure of the present invention however contains additional fields. The preamble portion 450 is similar to the preamble field defined in the CEBus standard. The start of packet (SOP) field 452 comprises symbols '1111' which are recognized as three consecutive zeros by the receiver of the present invention. It is important to note that a '1' in the start of packet field denotes a zero absolute shift while the term 'zero' denotes zero differential shift The term DCSK is derived from the fact that the receiver detects the differences of rotations between successive symbols received. If the two last zeros of the start of packet field are detected correctly than the receiver will synchronize and reception can proceed. The protocol version 454 is a three bit field containing the protocol version used for that particular packet. The protocol version field allows transmission protocols of various types ranging from high data rate transmission to low data rate transmission, for example. This field also allows any arbitrary user protocol to be implemented. The protocol version field is transmitted using one symbol and is required to have a shift value other than zero in order for the receiver to detect the end of the start up packet field and the beginning of the protocol version field. In addition, the protocol version field must be transmitted using a fixed number of bits per symbol that is known a priori by the receiver. This is to insure that the receiver can receive and decode the protocol version field. Once decoded, other modes of reception can be set. The structure and the coding of the remainder of the packet is also determined by the protocol version field. This includes the number of bits per symbol, i.e., the number of chirp shifts per symbol time. Typically, five bits gets transmitted for each symbol comprising a chirp.

The packet length 456 is a seven bit field indicating the size of the packet in bytes. Typically, the packet size is limited to a particular number such as 128 bytes or 1024 bits. The header error detection code (HEDC) 458 is an 8 bit field containing an error detection code for the protocol version and packet length fields. The data field 460 comprises a sequence of DCSK data chirps. The beginning of the field is aligned to a chirp boundary and the length of this field L in bytes is determined by the packet length field. The cyclic redundancy check (CRC) field 462 comprises a 16 bit error detection field. This field follows the DCSK data chirps continuously with no chirp boundary alignment. If any bits remain unused after the CRC field they are zero padded to the end of the last chirp.

Figure 4:
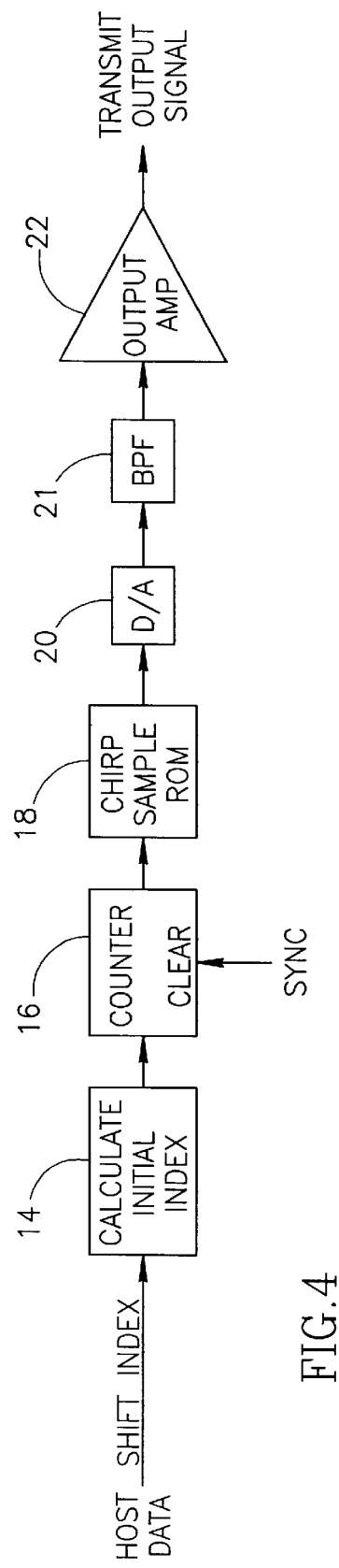
FIG. 4 is a high level block diagram illustrating the transmitter portion of a first embodiment of the present invention.

The transmitter portion of the communication system of the present invention will now be described in more detail. A high level block diagram illustrating the transmitter portion of the fast embodiment of the present invention is shown in FIG. 4. The transmitter and receiver portion of the present invention are described for the case in which the chirp or symbol time is divided into 32 shift indexes. Thus, during each symbol five bits are transmitted at a time. One skilled in the art could however modify the receiver and transmitter of the present invention for a higher or lower number of bits transmitted per symbol time. With reference to FIG. 4, a host supplies data to be transmitted to the transmitter, generally referenced 12. The host provides the data to be transmitted with the header and CRC field already generated. The host data which is used to form the shift index is input into the initial index portion 14 of the transmitter. The shift index comprises a number in the range of 0 to $2^n-1$ where 'n' denotes the number of bits transmitted per symbol time. In the example described herein 'n' is 5. Thus, the shift index comprises a number in the range of 0 to 31. The initial index into the chirp is calculated by dividing the length of the chirp by the total number of symbols in the encoding set, e.g. $2^n$, and multiplying by the shift index as given below.

$$\text{initial index} = \left[\frac{\text{chirp length}}{\text{total number of symbols}}\right] \cdot \text{shift index}$$

In this example, the chirp length is set to 512. Thus, each chirp is divided into 32 indexes each spaced apart from each other by 16, i.e., 0, 16, 32, etc. The initial index is then input to a counter 16 which counts modulo the chirp length, i.e., modular 512. A synchronization signal functions to clear the counter initially. The output of the counter is applied to the address inputs of a chirp sample read only memory (ROM) 18. This ROM contains the digitized representation of the chirp frequency waveform. The output of the ROM is input to a D/A converter 20 whose analog output is first filtered by a band pass filter (BPF) 21 having a suitable pass band in accordance with the signal width. The output of the BPF is then amplified by output amplifier 22. The output of the amplifier comprises the transmit output signal.

Figure 5A:
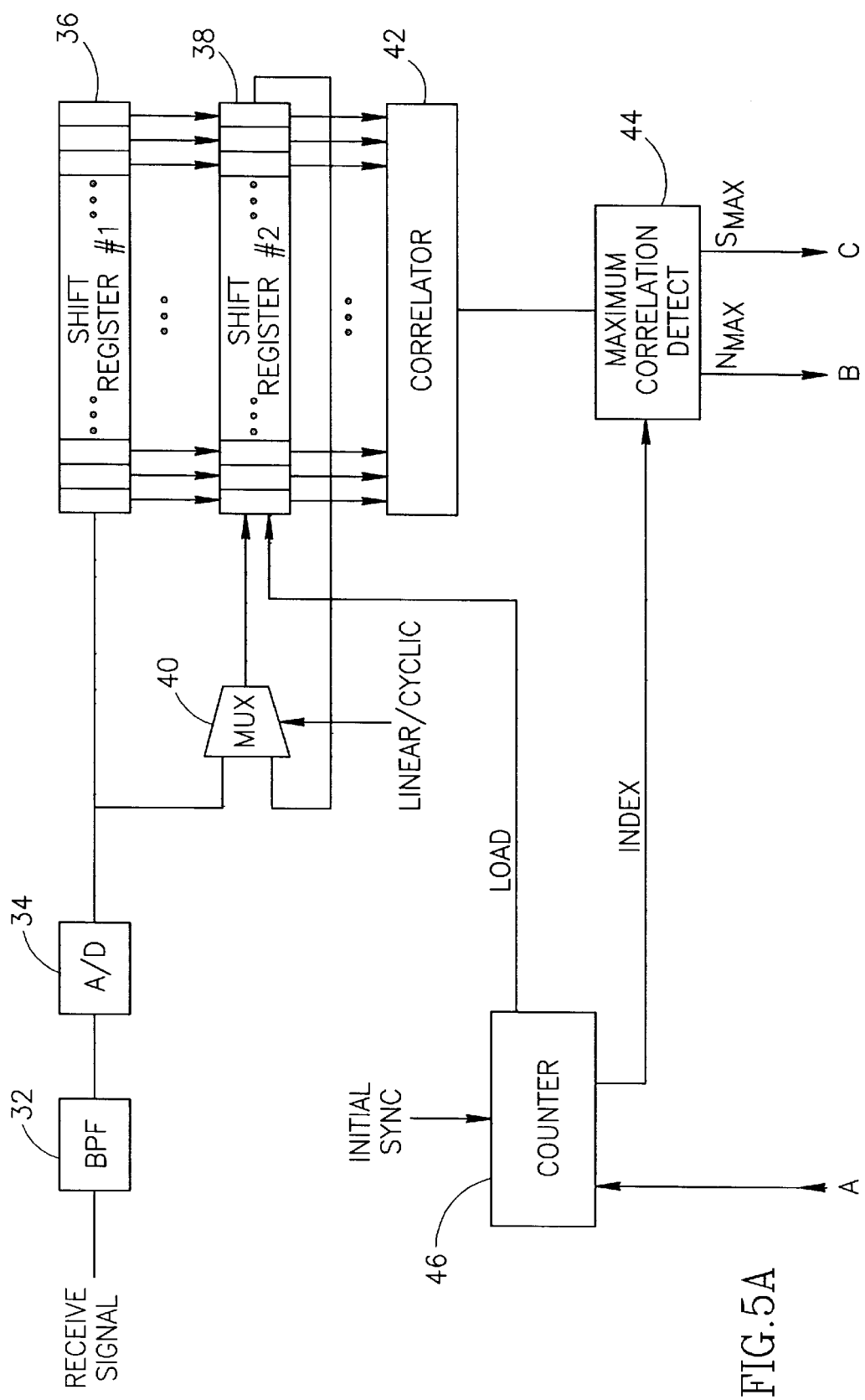
FIGS. 5A and 5B are high level block diagrams illustrating the receiver portion of a first embodiment of the present invention.
Figure 5B:
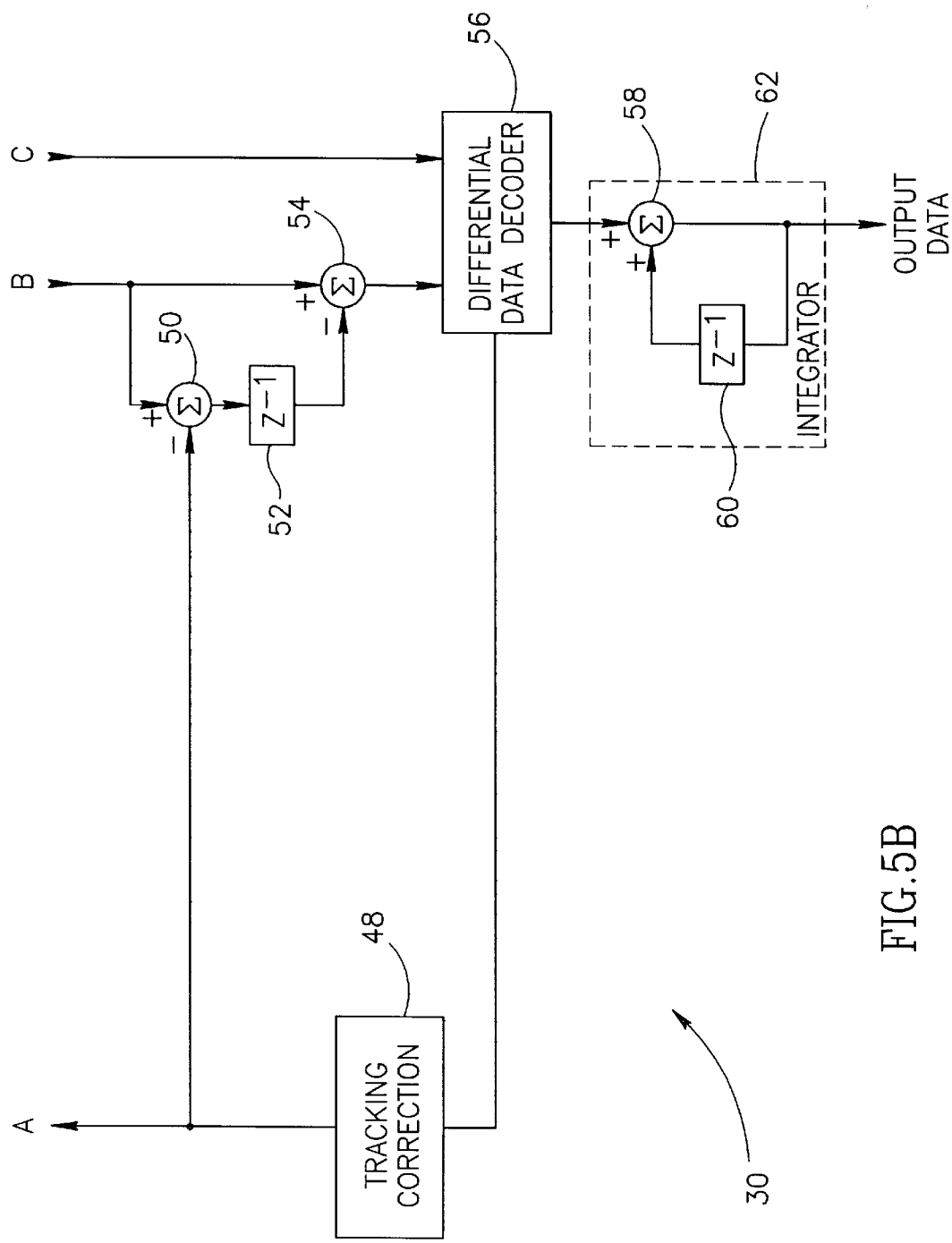

The receiver portion of the communication system of the present invention will now be discussed in more detail. A high level block diagram illustrating the receiver portion of the fast embodiment of the present invention is shown in FIGS. 5A and 5B. The received signal is input to band pass filter (BPF) 32 whose bandwidth is wide enough to receive the range of frequencies transmitted within a chirp. The output of the band pass filter is input to a one bit A/D converter 34. The 1 bit A/D converter can comprises a comparator in combination with a sampler clocked at a suitable sampling frequency. The output of the A/D converter is input to shift register #1 35 and one input of the two input multiplexer (mux) 40. The output of the multiplexer is input to a second shift register #2 38. For illustrative purposes, the length of both shift registers #1 and #2 are 256 bits long each. Each of the 256 bits output from shift register # 1 is input to shift register #2. The output of shift register #2 is input to the correlator 42. The correlator is implemented using a matched filter which functions to recognize the chirp pattern. The chirp pattern is stored as a template within the correlator and is used to detect the presence of chirps from the input signal received. The serial output of the shift register #2 is wrapped around to the second input of the multiplexer 40. The multiplexer select output is controlled by a linear/cyclic control signal.

The receiver, generally referenced 30, is capable of operating in either a linear or cyclic mode. For linear mode operation, the multiplexer is set to select the output of the A/D converter as the input to shift register #2. Before synchronization occurs, the correlator is set to operate in linear mode. As each bit is received it is clocked into shift register #2. The output of shift register #2 is input to correlator 42. Each bit input to the correlator is multiplied by a corresponding bit from the template. All 256 products are then summed to form the output of the cornelator. The multiplication of each input bit with the template bit within the correlator can be implemented using an XOR function, The sum output of the correlator is input to a maximum correlation detector 44. For each symbol period, the maximum correlation detector functions to determine a maximum of all 256 sums output by the correlator. The maximum correlation detector outputs two values upon detection of a maximum correlation sum. The first value $N_{MAX}$ indicates the position within the 256 possible shifts associated with the maximum correlation sum. In addition, the value $S_{MAX}$ represents the particular correlation sum that was found to be a maximum and which is associated with the position indicator $N_{MAX}$. Thus the value $N_{MAX}$ can take on any value ranging from 0 to 255. The shift index yielding the maximum correlation is then input to a differentiator. The differentiator comprises a summer 50, a delay unit 52 and a second summer 54. The delay unit 52 functions to delay the input value by one unit symbol time. The output of the delay unit is subtracted via summer 54 modulo the chirp length from the current index value. The output of summer 54 represents the difference or delta shift between two the shifts detected corresponding to two consecutive symbol times.

The output of the summer and the correlation maximum itself $S_{MAX}$ are input to differential data decoder 56. The differential data decoder functions to map the shift indexes which can tange from 0 to 255 to values within the range 0 to 31 in accordance with the original data transmitted.

In the cyclic mode of operation the output of the one bit A/D converter 34 is input to shift register #1 36. Received data is clocked into shift register #1 until it is full. At that point the shift register contains data representing a complete symbol time. Once full, the contents of shift register #1 are loaded in parallel fashion into shift register #2. The multiplexer 40 is selected to wrap the serial data out of shift register #2 back to its serial data in. The counter 46 functions to count through the length of a chirp which is normally one UST wide. An initial synchronization signal is used to reset the counter initially. A load signal output from the counter is input to shift register #2 which serves to provide the timing for dumping the contents of shift register #1 into shift register #2. Shift register #2 is clocked the same number of times as the number of bits comprising the length of the shift register. For each rotation of the shift register, the correlator generators a sum which is input to the maximum correlation detector. For each 256 rotations of the shift register, the maximum correlation detector outputs $N_{MAX}$ and $S_{MAX}$ values corresponding to the index yielding the maximum correlation sum and the maximum sun itself. The counter provides a count index which is input to the maximum correlation detector. This index provides the value of the counter for each rotation of the shift register #2.

A tracking correction circuit 48 fine tunes the value in the counter on a symbol by symbol basis. The tracking correction circuit functions to fine tune the value in the counter in a symbol by symbol basis. Small differences between the received index and an ideal index are used as input to the tracking correction circuit 48. A positive or negative error signal is output by the traciicng correction circuit and input to the counter. This error signal serves to fine tune the value in the counter to better track the reception and correlation of the chirps within each symbol time.

The transmitter 12 shown in FIG. 4 transmits data using an absolute mode of transmission. In this mode, all $2^n$ symbols are transmitted directly without differentiation or integration. Each five bit symbol is used to directly determine the rotation shift index for each chitp within a UST. Accordingly, the receiver 30 shown in FIGS. 5A and 5B includes an integrator 62 which functions to integrate the delta shifts generated by the differential data decoder. Alternatively, additional modes of transmission and reception are possible. For example, the transmitter can be used in a differential mode whereby the transmitter integrates the data before it is transmitted, modulo the chirp length. Accordingly, the receiver must differentiate the receive data in order to properly receive, as is done in the receiver shown in FIGS. 5A and 5B. However, in this case, the integrator is not needed. In another alternative, the data is first differentiated modulo the number of shift indexes in the transmitter, encoded and then integrated before being applied to the chirp sample ROM. Accordingly, the receiver first differentiates the data, decodes the output of the differentiator and finally integrates the output of the decoder to form the output of the receiver. The encoder in the transmitter functions to encode the entire symbol including both data and non data symbols.

This last alternative can be used to encode the data symbols ($2^n$ or any other number) in addition to extra symbols not within the set of data symbols. In the five bit example presented here, this would allow a total number of symbols greater than 32 to be transmitted, some of the symbols being non data symbols. To accomplish this, the chirp symbol time is divided into a number of shift indexes greater than 32 in order to accommodate the extra non data symbols.

Figure 6:
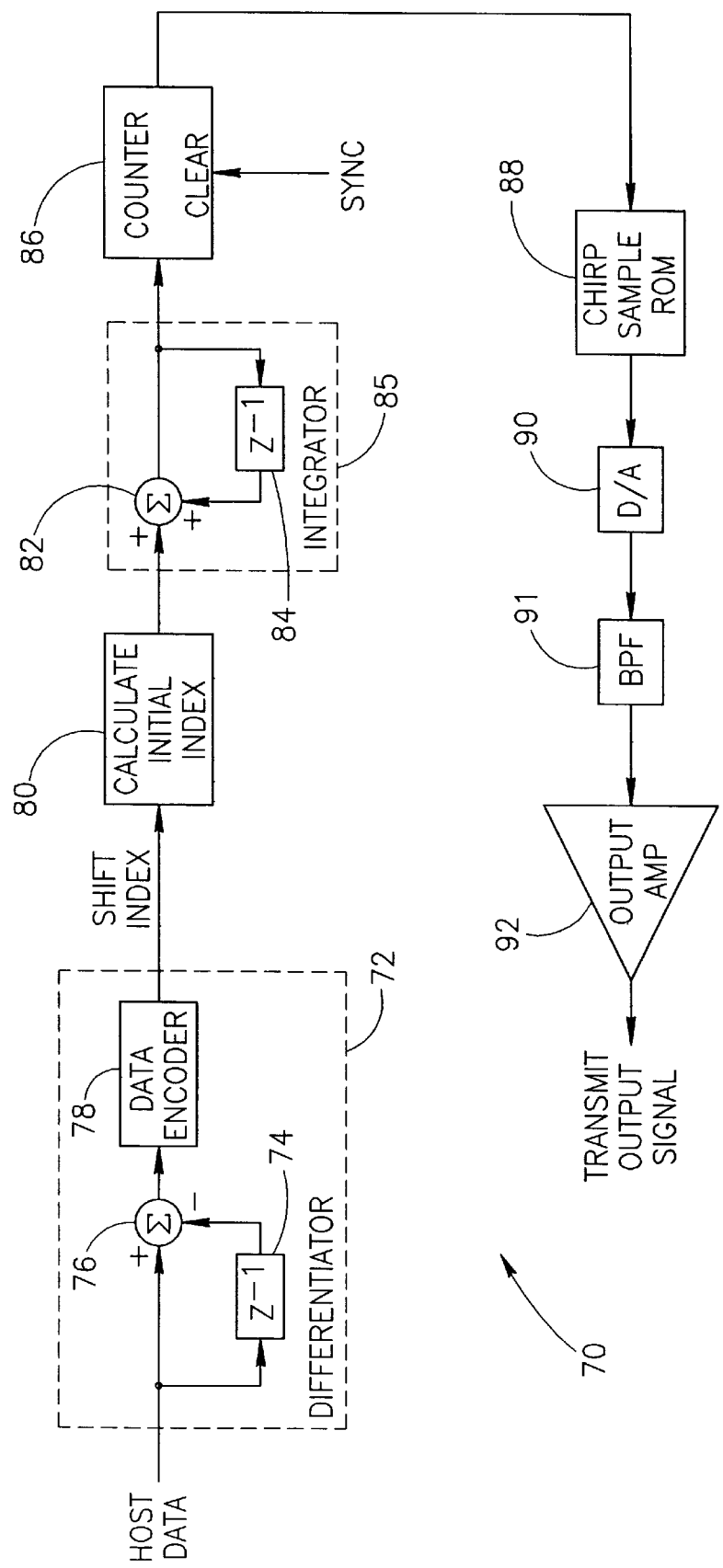
FIG. 6 is a high level diagram illustrating the transmitter portion of a first embodiment of the present invention suitable for transmitting differential data or absolute data having extra non data symbols.

A high level diagram illustrating the transmitter portion of the fast embodiment of the present invention suitable for transmitting differential data or absolute data having extra non data symbols is shown in FIG. 6. To transmit data using a differential mode of transmission the optional differentiator 72 is not required. The host provides data which serves as the shift index to the calculated initial index unit 80. The shift index within the chirp symbol is calculated and input to integrator 85 which comprises a summer 82 and a delay unit 84. The summer 82 adds modulo $2^n$, i.e., modulo 32. The output of the summer is delayed and added with the output of the calculate initial index unit 80. The output of the integrator is input to the counter 86 which functions similarly to the counter of the transmitter shown in FIG. 4. The chirp sample ROM 88, D/A converter 90, band pass filter (BPF) 91 and output amplifier 92 function similarly as the corresponding counterparts in the transmitter shown in FIG. 4.

Figure 7A:
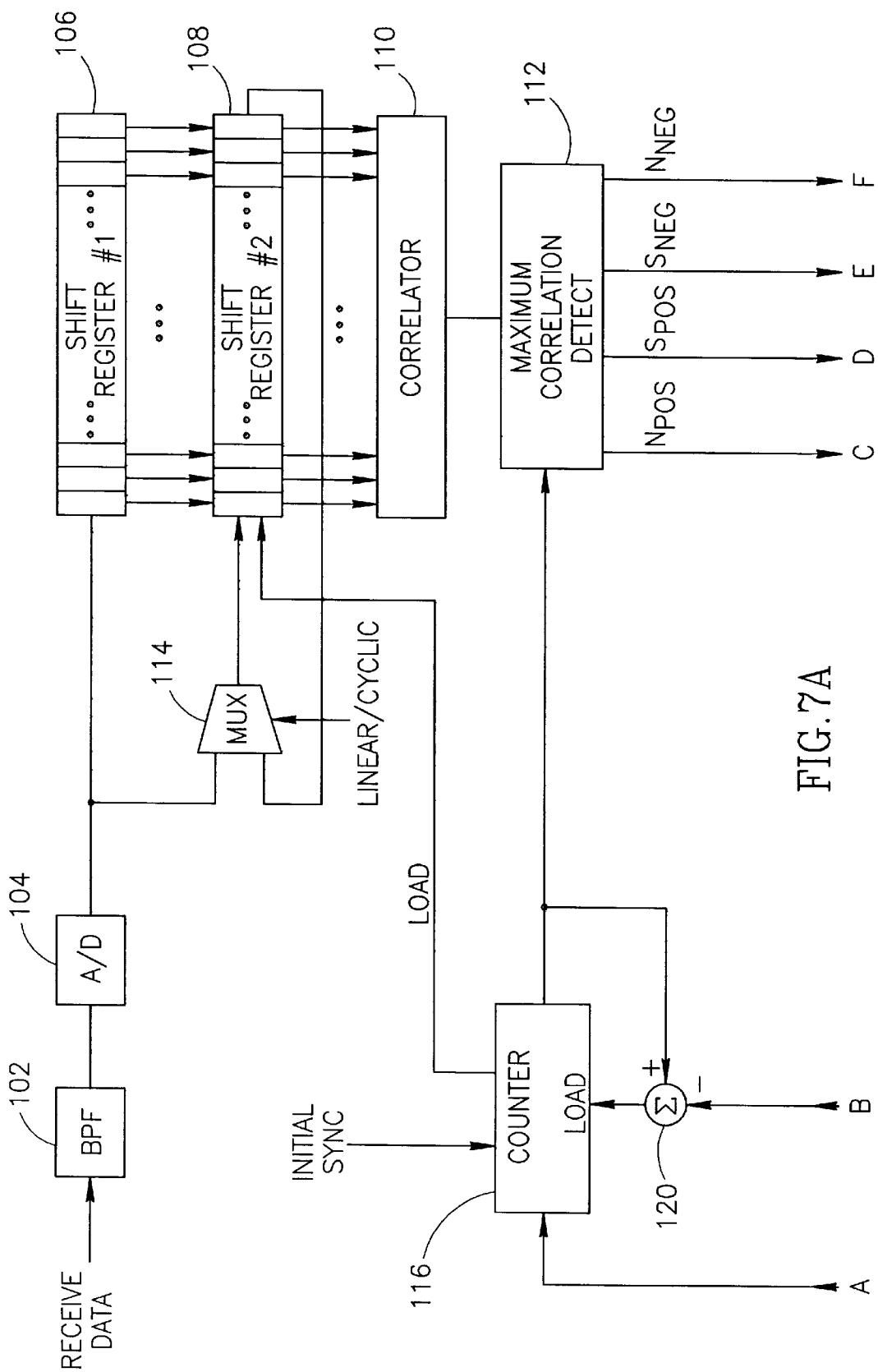
FIGS. 7A and 7B are high level block diagrams illustrating the receiver portion of the first embodiment of the present invention in more detail.
Figure 7B:
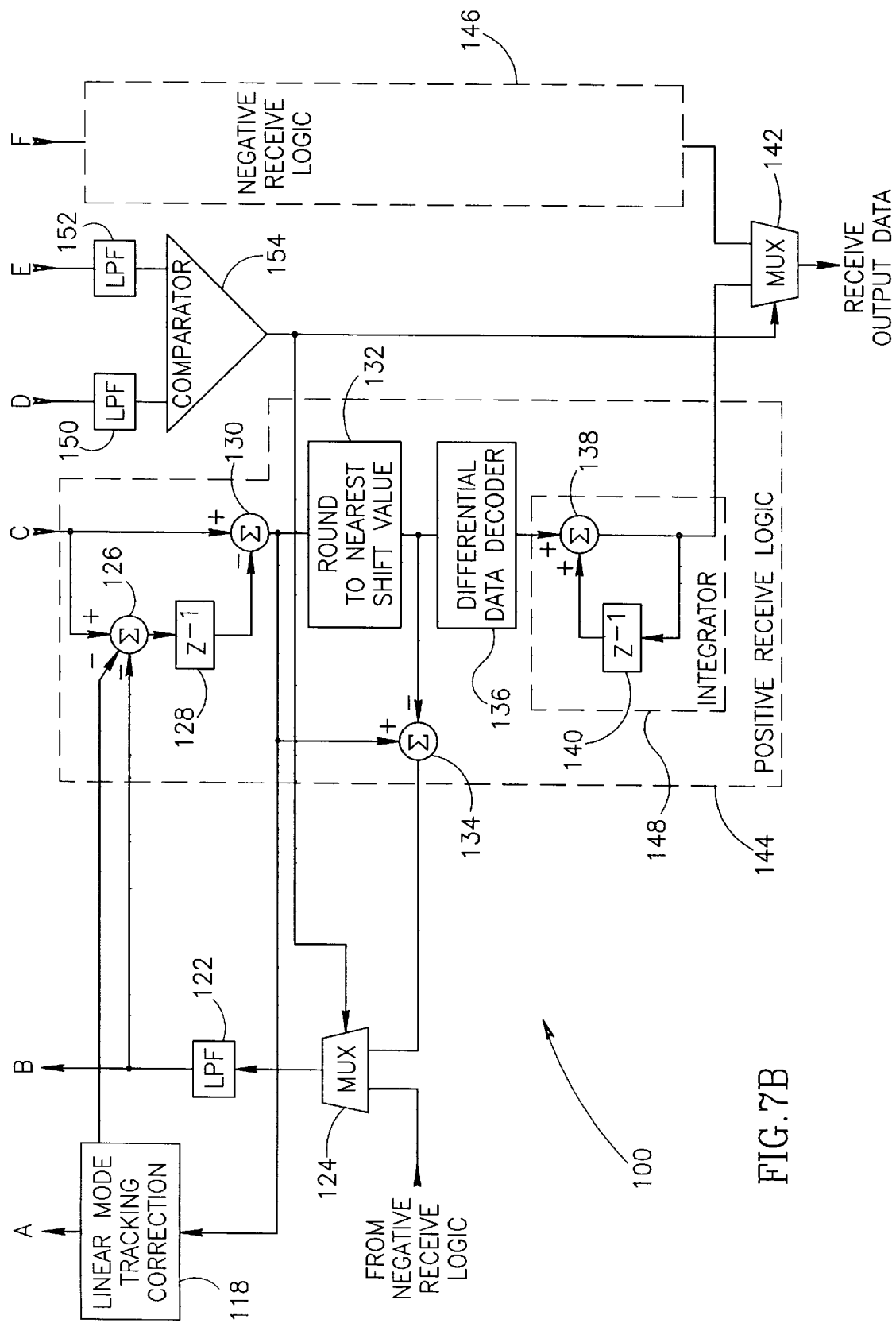

The receiver portion of the communication system of the present invention will now be described in more detail. High level block diagrams illustrating the receiver portion of the fast embodiment of the present invention in more detail are shown in FIGS. 7A and 7B. The analog received data is input to a band pass filter (BPF) 102 whose bandwidth is set to span the frequency range of the chirp waveform. The output of the BPF filter is input to a one bit A/D converter 104 which may be implemented using a comparator in combination with a sampling circuit. The output of the A/D converter is input to shift register #1 106 and multiplexer (mux) 114. The output of the multiplexer 114 is input to shift register #2 108 whose serial output wraps around to the second input of the multiplexer. As in the receiver of FIG. 5A and 5B, the multiplexer is selected by a linear/cyclic control signal.

Linear mode reception is utilized during the preamble for synclronization purposes. Once synchronization is achieved the cyclic mode of reception is utilized to demodulate the remainder of the packet. During the linear mode of operation the multiplexer is selected to input data to shift register #2 from the A/D converter 104. As each bit is shifted through shift register #2, correlator 110 generates a sum output which is input to the maximum correlation detector 112. Once synchronization is achieved, the receiver switches into the cyclical mode of operation. In this mode, data for an entire UST is shifted into shift register #1 and upon a load command from the counter 116 the entire contents of shift register #1 are transferred to shift register #2. The contents of shift register #2 are then rotated bit by bit through multiplexer 114. The output of shift register #2 is input to the correlator 110 which serves as a matched filter. Each of the 256 bits of shift register #2 are multiplied by a corresponding bit of a template stored within the correlator 110. All 256 products are then summed to generate the output of the correlator. The multiplication can be implemented using XOR gates. Note that after suitable conversion the correlator generates a sum that can be both positive and negative in sign.

Alternatively, the correlator can implement the matched filter using less than 256 taps. The number of taps used by the correlator can actually be reduced to almost a third of full number of taps which corresponds to the number of bits in shift register #2. This is achieved by sampling the template against a threshold for both positive and negative values of the template. The positive values of the template are compared against a positive threshold and any values below this threshold are thrown away and not used. Similarly negative values of the template are compared to a negative threshold and any values less than the negative threshold are also thrown away and not used. In this fashion, the number of taps can be reduced by almost two thirds. This actually improves performance since noise cannot be introduced through the taps that are eliminated because they do not contribute to the output sum of the correlator.

The output sum of the correlator is input through the maximum correlation detector which functions to find a maximum correlation sum for both positive and negative values of the sum within in each UST. The maximum correlation detector outputs two shift indexes representing the shift value achieving maximum correlation for both positive and negative values of the correlation sum, $N_{POS}$, $N_{NEG}$, respectively. In addition, the corresponding absolute values of the correlation sum of both positive and negative correlation maximums are also output, $S_{POS}$, $S_{NEG}$, respectively. The sums $S_{POS}$ and $S_{NEG}$ are input to low pass filters (LPF) 150, 152 respectively. The correlation sums are smoothed before being input to the comparator 154. The comparator 154 functions to determine the maximum between the positive and the negative correlation sums. The output of the comparator forms the basis for choosing the positive index $N_{POS}$ or the negative index $N_{NEG}$.

The positive index is input to a positive receive logic circuit 144 and the negative index is input to negative receive logic 146. Both positive and negative receive logic circuits function identically and only the positive receive logic circuit is shown for clarity sake. The index output by the maximum correlation detector is first differentiated. The differentiator comprises summer 126, delay unit 128 and summer 130. The differentiator generates the shift deltas between each shift index found by the maximum correlation detector. This delta shift value is then rounded to the nearest shift value. In the example presented herein, using a shift register having 256 bits and symbols having five data bits translates to shift indexes separated from each other by 8 bits. Thus, the delta shift indexes output by the differentiator are rounded to the nearest multiple of 8 bits, i.e., 0, 8, 16, 24, etc.

The rounded delta shift index is then input into the differential data decoder 136 which functions to decode the shift index to a value between 0 and 31 representing the transmitted data. If the transmitter is set to absolute mode of transmission, i.e., straight encoding of data bits to symbols without differentiation or integration, the output of the differential data decoder represents the differentials between symbols and needs to be integrated in order to recover the original data transmitted. The integrator 148 comprises a summer 138 and a delay unit 140. The current shift index which comprises a value within the range 0 to 31 is added modulo 32 with the previous output of the summer. This value forms the output data of the receiver and represents the five bits originally transmitted.

The output of the integrator 148 along with the output of the corresponding integrator and the negative receive logic equation 146 are input to multiplexer 142. The output of the comparator 154 serves as the select input to the multiplexer 142. Thus the index yielding the larger correlation sum is used to determine the receive output data.

The receiver also comprises a linear mode tracking correction circuit 118 which functions to check for shift indexes close to the upper edge of the UST. During operation of the receiver, it is not desirable to have correlation peaks occur close to the upper end of the UST. With very high shift indexes, it is possible for the correlation peak to straddle the border between two UST periods. Thus, if it is detected that peaks are occurring close to a UST border, the linear mode tracking correction circuit functions to adjust the counter value by approximately 10% in order to move the correlation peak away from the UST border.

The value output by the linear mode tracking correction circuit is subtracted from the counter. The modification to the counter value is effective to re-adjust the symbol reference point for the receiver so that correlation peaks do not straddle borders between symbols. Note that the linear mode tracking correction circuit is operative during the linear mode of operation which is used to receive the start of packet field. Once tracking and synchronization is complete the receiver switches to cyclic mode or reception for the remainder of the packet.

In addition to providing a correction for the counter, the linear mode tracking correction circuit also provides a correction signal to the summer 126 which is part of the differentiator in the positive receive logic portion 144. Similarly, the correction signal is applied to the corresponding summer in the negative receive logic circuit 146. The correction signal to the summers is required in order to keep the counter value synchronized to the differentiators.

In addition, the receiver 100 is operative to correct for clock drift during both linear and cyclic modes of operation. A correction signal is generated based on the difference between the differentiated shift index both before and after rounding to the nearest whole shift value. The rounded off shift value is input to a summer 134. The rounded shift value is then subtracted from the unrounded shift value and the difference is low pass filtered and used to adjust the value in the counter 116. Depending on whether the comparator 154 has chosen to use the positive or negative shift index, the multiplexer 124 functions to pass either the value from the positive receive logic or the negative receive logic to the low pass filter 122. The output of the low pass filter functions to smooth the round off correction before it is input to the summer 120. An overflow on the output of the summer 120 causes the counter to be reloaded with zero for a new count. The correction signal from the low pass filter is subtracted from the current value of the counter by the summer. The clock drift correction signal output from both the summer 134 in the positive receive logic and the corresponding summer in the negative receive logic can have be either positive or negative in sign. Using this technique, synchronization of the counter to a symbol period is maintained.

A high level flow diagram illustrating the preamble and synchronization reception method of the fast embodiment of the present invention is shown in FIG. 8. Initially, all flags and counters are reset (step 160). The linear mode of operation for the correlator is then set (step 162). Received data bits are shifted into shift register #2 until a maximum correlation is found (step 164). Once a maximum correlation peak is found, the receiver searches for the next maximum correlation peak. A zero counter is incremented (step 172) when a differential zero is detected (step 166). A differential zero is detected when the absolute value of the difference between consecutive correlation peaks is less than one half of a minimal delta shift, i.e., less than ½(½")UST, where n is the number of bits per symbol initially, e.g., 3 bits, before the protocol version field is read. It is also checked whether the peak value of the correlation sum is greater than a predetermined threshold (step 174). If the peak value of the correlation is greater than the threshold a 'carrier detect' signal is reported (step 176). A 'high zero' counter is then incremented which functions to count the number of zero deltas received that are higher than the threshold, i.e., deltas equal to zero (step 178). Once a minimum of two high zeros are received (step 180) the receiver is considered to be synchronized. The time base is then corrected in accordance with the value of $N_{MAX}$ (step 182). Once the receiver is synchronized, this shift index value represents the offset of the current counter value from a symbol boundary. The counter is adjusted using the value of $N_{MAX}$ to effect proper framing of each symbol, i.e., the counter begins counting at the start of each symbol, Reception of the remainder of the packet then continues using the cyclic mode of reception (step 188).

Referring to step 166, if consecutive correlation peaks are not within half a minimal delta shift of each other then the zero counter is cleared (step 170). In addition, the high zero counter is also cleared (step 168). The receiver then continues in the linear mode of reception and attempts to find a maximum correlation peak during subsequent UST periods.

If the peak value is less than the predetermined threshold (step 174) then it is checked whether the zero counter value is greater than five (step 184). If the value of the counter is less than five then the high zero counter is cleared (step 168) and the receiver continues to search for the next maximum correlation peak. If the zero counter value is greater than five then this indicates that a standard CEBus packet is being received and the receiver switches to standard CEBus reception using the linear mode of reception of the receiver (step 186).

Figure 9:
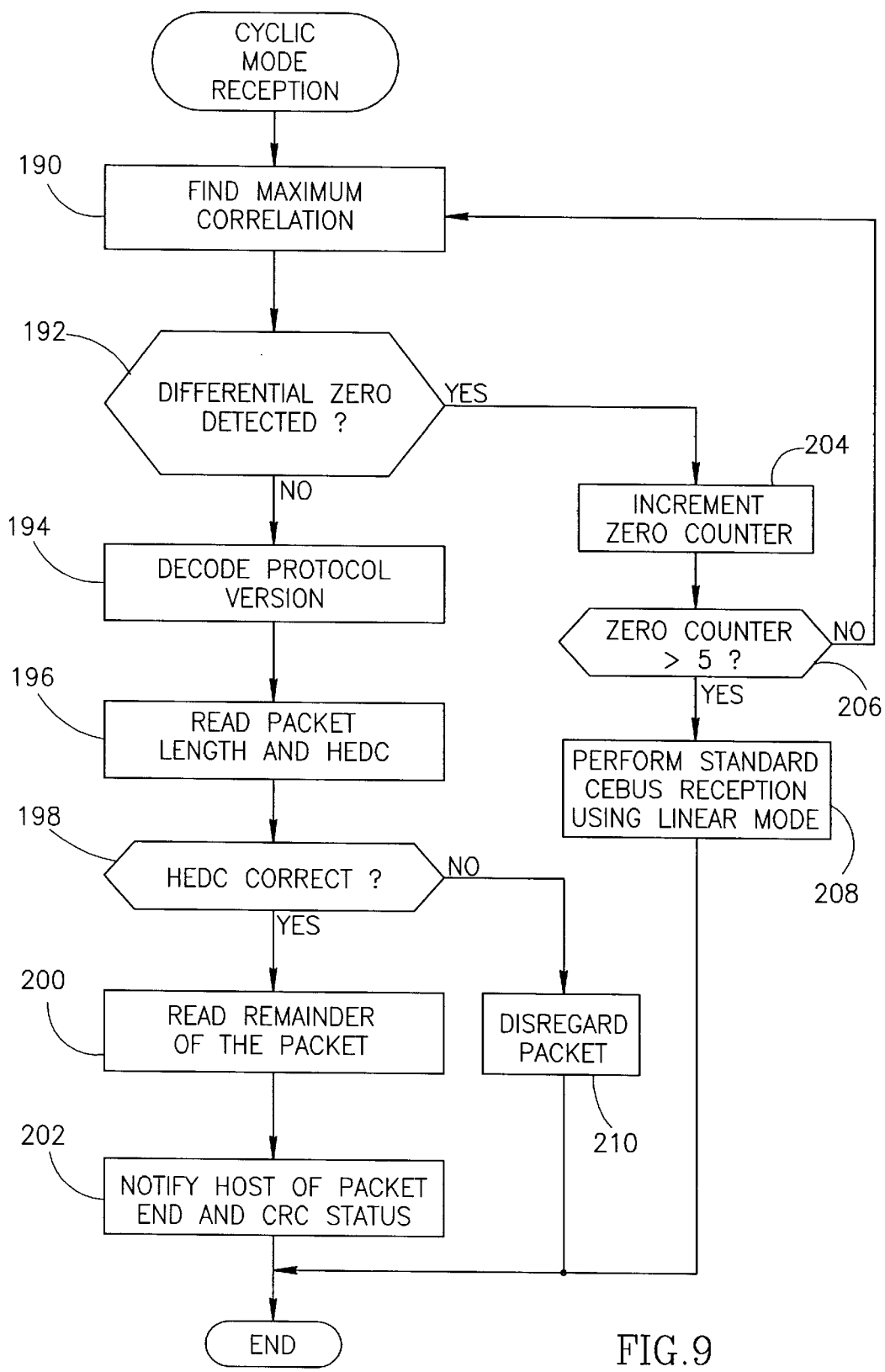
FIG. 9 is a high level flow diagram illustrating the cyclic mode reception method of the first embodiment of the present invention.

A high level floating diagram illustrating the cyclic mode of reception of the fast embodiment of the present invention as shown in FIG. 9. The cyclic mode of reception is typically used to receive the portion of the packet following synchronization. The first step is to find the correlation peak for each all bits within the UST, i.e., 256 shifts of shift register #2 108 (FIG. 7A) (step 190). If a differential zero is detected (step 192) then the zero counter is incremented by one (step 204). A differential zero is detected if the absolute value of the previous maximum correlation peak location subtracted from the current correlation peak location is less than one half of a minimal delta shift, i.e., less than ½(½")UST where n is the number of bits per symbol initially, e.g., 3 bits, before the protocol version field is read. If the value of the zero counter is not greater than five, then control returns to step 190 and the receiver searches for the next maximum correlation peak (step 206). If the value of the zero counter is greater than five then a standard CEBus bus packet is being received and the receiver is switched to the linear mode of operation in order to perform standard CEBus reception (step 208).

If the absolute value of the difference between two correlation peaks is not within one half a minimal delta shift then the protocol version field of the packet is then decoded (step 194). As described previously, the start of packet (SOP) field contains four symbols having zero rotation shift. The receiver decodes these symbols differentially as zeros. Detection of a non zero delta shift indicates the start of the protocol version field since the protocol version field is a single symbol of non zero shift.

Next, the packet length and the header error detection code (HEDC) are then read (step 196). If the header error detection code is correct (step 198), the remainder of the packet is then read (step 200). If the header error detection code is not correct then the packet is disregarded (step 210). Once the complete packet is received the notification is provided of the end of packet and the status of the CRC check (step 202).

Figure 10:
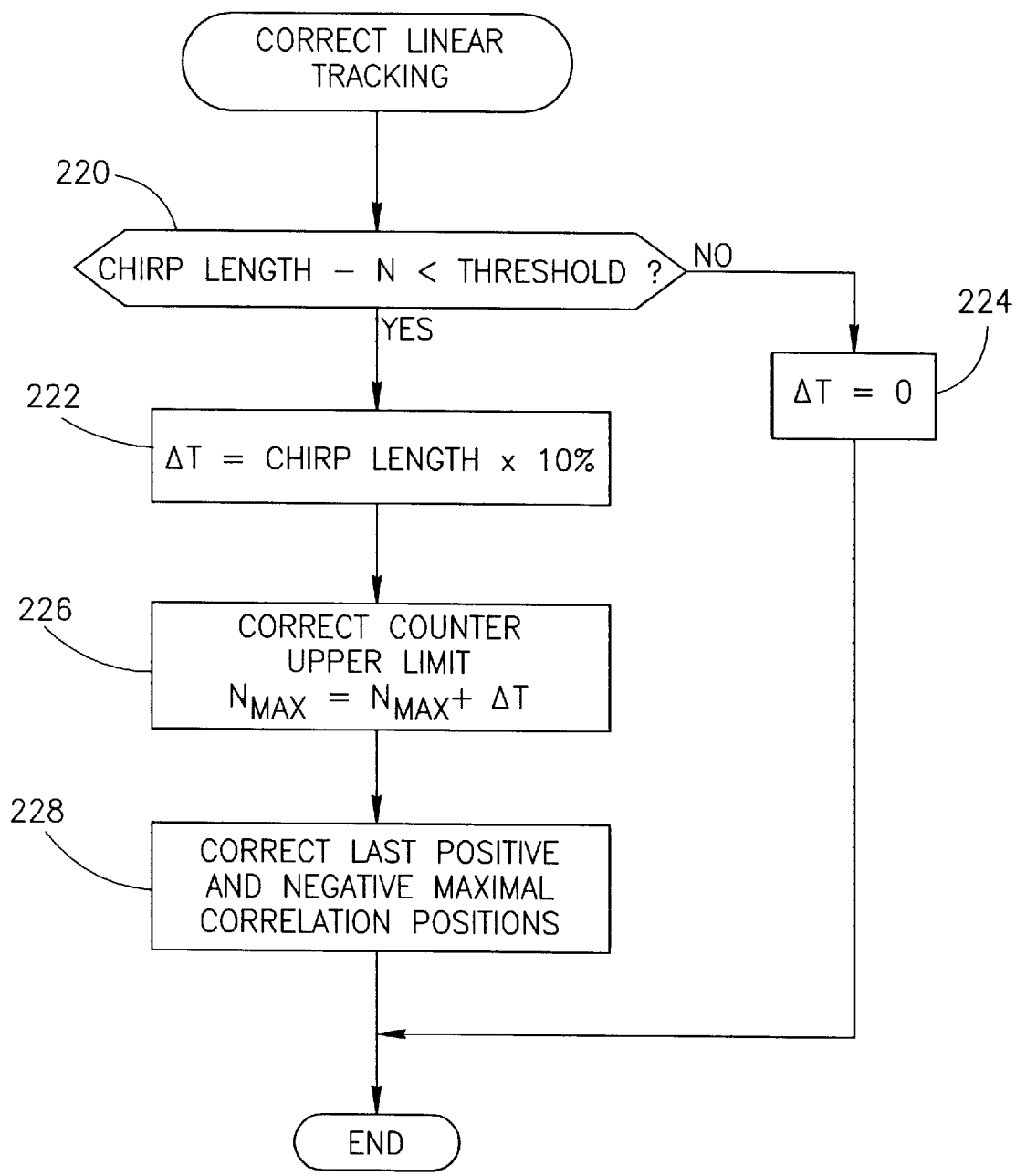
FIG. 10 is a high level flow diagram illustrating the linear tracking correction method of the present invention.

A high level flow diagram illustrating the linear tracking correction method of the present invention is shown in FIG. 10. As described previously, tracking correction is performed by the linear mode tracking correction circuit 118 (FIG. 7B). If the chirp length minus the currently received shift index (represented by N) is less than a predetermined threshold (step 220), a time value ΔT is set preferably to 10% of the chirp length (step 222). The counter 116 (FIG. 7A), which counts modulo the chirp length, is corrected using this ΔT value (step 226). In particular, the upper limit of the counter is adjusted in accordance with ΔT. In addition, the last positive and negative maximum correlation shift positions are also corrected in accordance with the ΔT value (step 228). If the chirp length subtracted from the current shift index is greater than or equal to the predetermined threshold then ΔT is set to zero and the counter is not modified (step 224).

The second or reliable embodiment of the spread spectrum communication system of the present invention will now be described in more detail. The reliable embodiment achieves a higher level of reliability by combining a plurality of single UST chirps to generate a single superchirp. For example, eight 100 micro second UST periods can be combined to form a super UST period of 800 micro seconds. Differential code shift keying (DCSK) is then applied to this superchirp in similar fashion to each individual symbol in the fast embodiment described above.

In the reliable embodiment, the data is transmitted in the form of time shifts between circularly rotated superchirps. In the example presented herein, each superchirp comprises eight standard CEBus chirps forming a superchirp 800 micro seconds long. Each individual chirp within the superchirp is circularly shifted by a particular amount. The individual amounts of shift for each chirp within the superchirp is fixed for all superchirps transmitted. The amount of shift or rotation for each chirp is chosen such that the spurious peaks in the superchirp auto correlation are relatively low. In addition, the shift for each individual chirp is chosen such that the shifts between consecutive chirps are far enough away from zero such that a superchirp will not be recognized as a start of packet (SOP) for standard CEBus packets or packets sent using the fast embodiment of the present invention.

Figure 11:
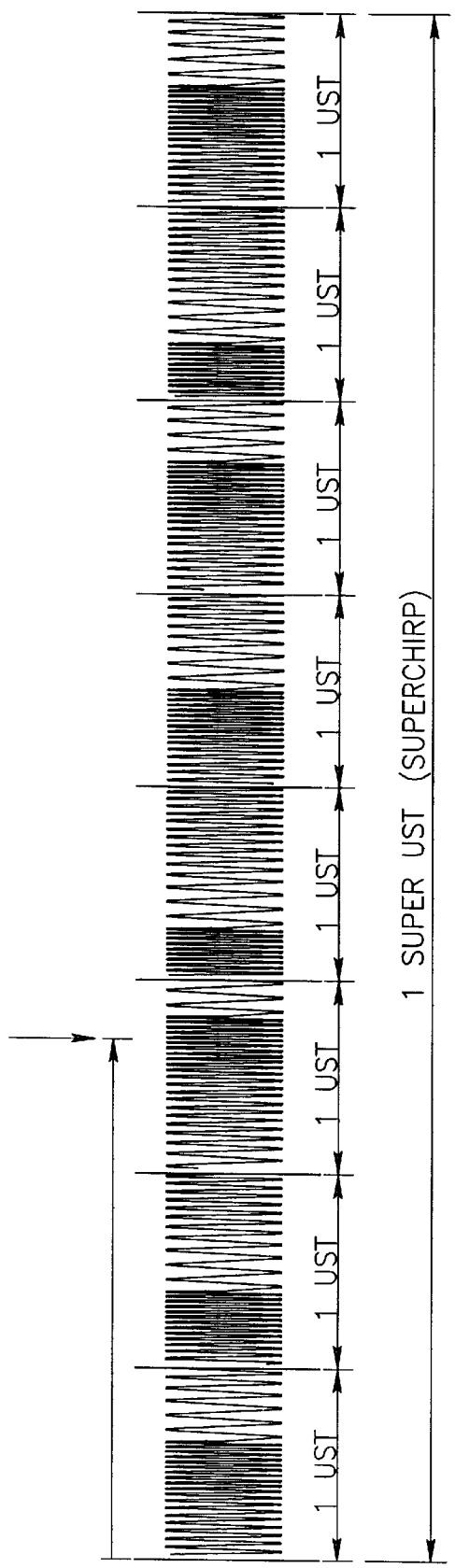
FIG. 11 is an illustration of a waveform of a superchirp generated from multiple single chirps and comprising one super UST.

Similar to the fast embodiment, the number of bits transmitted within each superchirp determines the minimum number of shift indexes needed. An example of the shift index for a particular data sample is shown in FIG. 11. In this case, the superchirp would begin to be transmitted at the point of the downwardly pointing arrow. The transmission would wrap around at the end of the waveform and return to the point of the downward arrow.

The packet structure of the communication system of the reliable embodiment of the present invention is similar to that of the fast embodiment shown in FIG. 3. The packet structure for the reliable embodiment comprises a preamble, start of packet (SOP) field, protocol version field, packet length field, header error detection code (HEDC), a differential code shift data field and a CRC field. The packet structure for the reliable embodiment differs from that of the fast embodiment in that the start of the packet field for the reliable embodiment comprises four superchirp symbols having zero rotation shift rather than four regular chirp symbols having zero shift. The four superchirp symbols are recognized by the receiver as thee differential shifts of zeros. Reception is possible if at least two more of the last transmitted zeros are detected correctly. At this point the receiver will synchronize to the received symbol stream. The remaining fields are identical to the corresponding fields of the packet structure of the fast embodiment.

Additional reliability is achieved in the second embodiment by dividing the reception band into two or more equal sized sub-bands. In the example presented herein, the reception band is divided into three equal sized sub-bands. For a chirp waveform that spans frequencies from 100 KHz to 400 KHz, the three bands may be, for example, 100 to 200 KHz, 200 to 300 KHz, and 300 to 400 KHz. Accordingly, the receiver comprises three band pass input filters. The output of each band pass filter is input to a one bit A/D converter which converts the output of each band pass filter to a binary value. The one bit A/D converter may comprise a comparator followed by a sampler clocked at the appropriate sampling frequency. Assuming a 5.12 MHz clock rate, each band is sampled at a frequency of 320 KHz to form the I or in phase data stream. The output of the one bit A/D converter is also input to a delay unit which delays the signal by an amount equal to $$\frac{1}{4f_c}.$$

The value $f_c$ represents the demodulating frequency of each of the pass bands. The output of the delay unit is sampled at the sampling rate $f_s$ forming the Q or quadrature data stream. Thus the Q samples are delayed with respect to the I samples by 90 degrees of the demodulating frequency within each pass band. The I samples of the three bands are aligned after sampling but the Q samples are not due to the band dependent delay.

The demodulating frequency $f_c$ of each band is preferably a multiple of one half of the sampling frequency $f_s$. In the case where the sampling frequency is 320 KHz, it is thus preferable to make the center frequency a multiple of 160 KHz. The demodulating frequency may be chosen such that it is a closest multiple of FS over two to the middle of the particular frequency band. In the example presented herein, band #1 ranges from 100 to 200 KHz and $f_c$ is chosen to be 160K. Band #2 ranges from 200 to 300 KHz and $f_c$ is chosen to be 240 KHz. Band #3 ranges from 300 to 400 KHz and $f_c$ is also chosen to be 320 KHz. The delay between each of the I and Q data streams is equal to $$\frac{1}{4f_c}$$

which translates to 90 degrees of that particular carrier. The I and Q data streams are then complex correlated using a complex template to yield real and imaginary corelation sums. These sums are then squared and summed and input to a maximum correlation detector. The maximum correlation sum from all tee pass bands is determined and used to generate the output of the receiver for the particular symbol.

Figure 12:
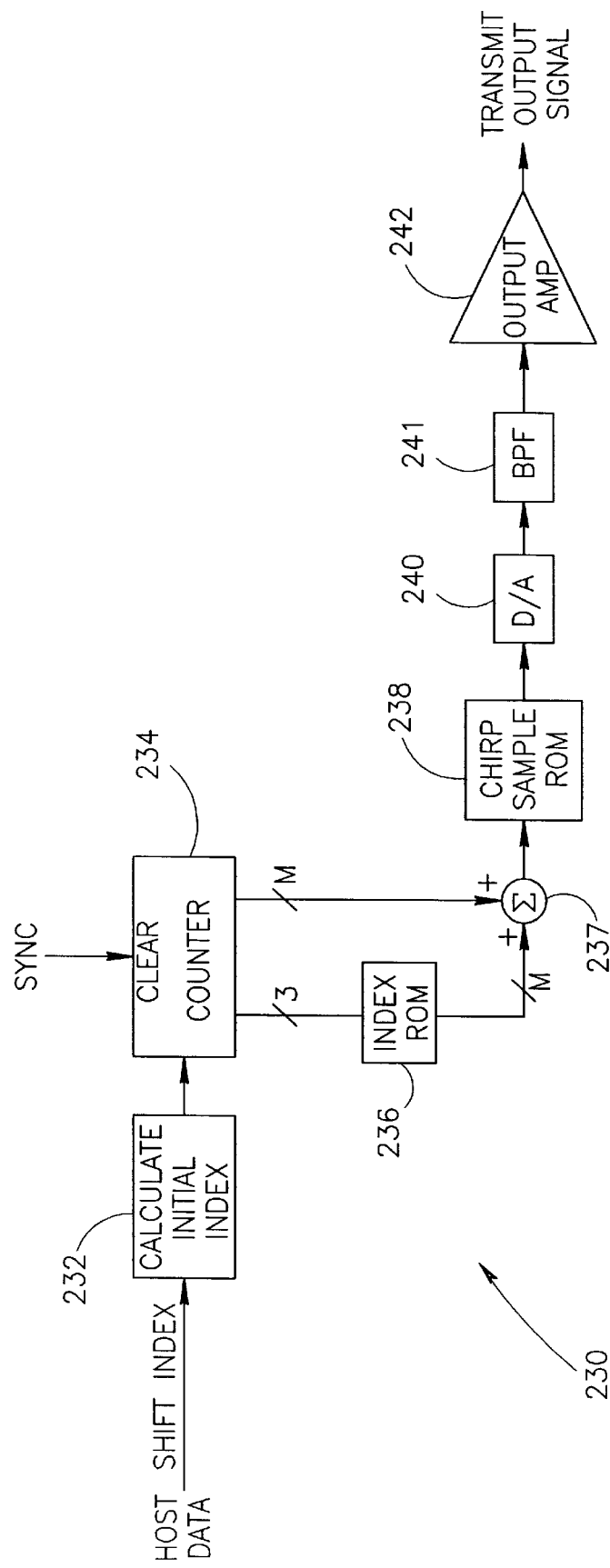
FIG. 12 is a high level block diagram illustrating the transmitter portion of a second embodiment of the present invention.

A high level block diagram illustrating the transmitter portion of the reliable embodiment of the present invention is shown in FIG. 12. The transmitter, generally referenced 30, is suitable for generating absolute transmission data as opposed to differential transmission data. If it is desired to transmit differential data, an integration step is required. With reference to FIG. 12, data is received from the host The host previously generating and appending a header and a CRC checksum. The data is input to the calculate initial index unit 232. The data from the host forms the shift index used to calculate the index into the superchirp. This index is calculated in similar fashion to that of the transmitter of FIG. 4. The length of the superchirp is divided by the number of possible shifts of each superchirp symbol and then multiplied by the shift index. In the case when each superchirp transmits five bits, the shift index can comprise values from 0 to 31. In addition, for example presented herein, the superchirp length is talcen to be 2048 samples. Thus, the initial index comprises a number from 0 to 2047. This initial index is then input to a counter 234. The counter is an eleven bit modulo 2048 counter that is divided into two portions, one three bits long and a section M bits long where M in this case is equal to eight. The three bit portion corresponds to the eight chirp periods making up a superchirp symbol. The three upper significant bits are input to an index ROM 36 which functions to output an M bit value which corresponds to the starting point or initial shift index for each individual chirp within the superchirp. These eight initial shift indexes are chosen a priori for all symbols transmitted and are chosen so as to maximize the auto correlation of the superchirp. The M bits output by the index ROM are added by summer 237 with the M significant bits from the counter 234. The summer 237 adds these two values together modulo the chirp length of each individual chirp comprising the superchirp, which in this case is 256. The output of the summer is input to a chirp sample ROM 238 which is addressed using the eight bits output by the summer 237. The output of the chirp sample ROM is converted by the D/A converter 240 to analog, filtered by band pass filter (BPF) 241 and amplified by output amplifier 242. The output of the amplifier forms the transmit output signal.

The superchirp is constructed using eight chirps for compatibility with standard CEBus systems. However, the only requirement is that the symbol length be longer than that used in the fast embodiment. Thus, the superchirp can alternatively comprise a single chirp that spans the entire symbol length. Using a longer length chirp results in higher reliability due to an increase in the symbol length and correspondingly more accurate correlation. In addition, higher reliability is also achieved due to the utilization of multiple passbands in the receiver. Note that a receiver can be constructed utilizing either one of these techniques alone or in combination to improve reliability of transmission.

Figure 13:
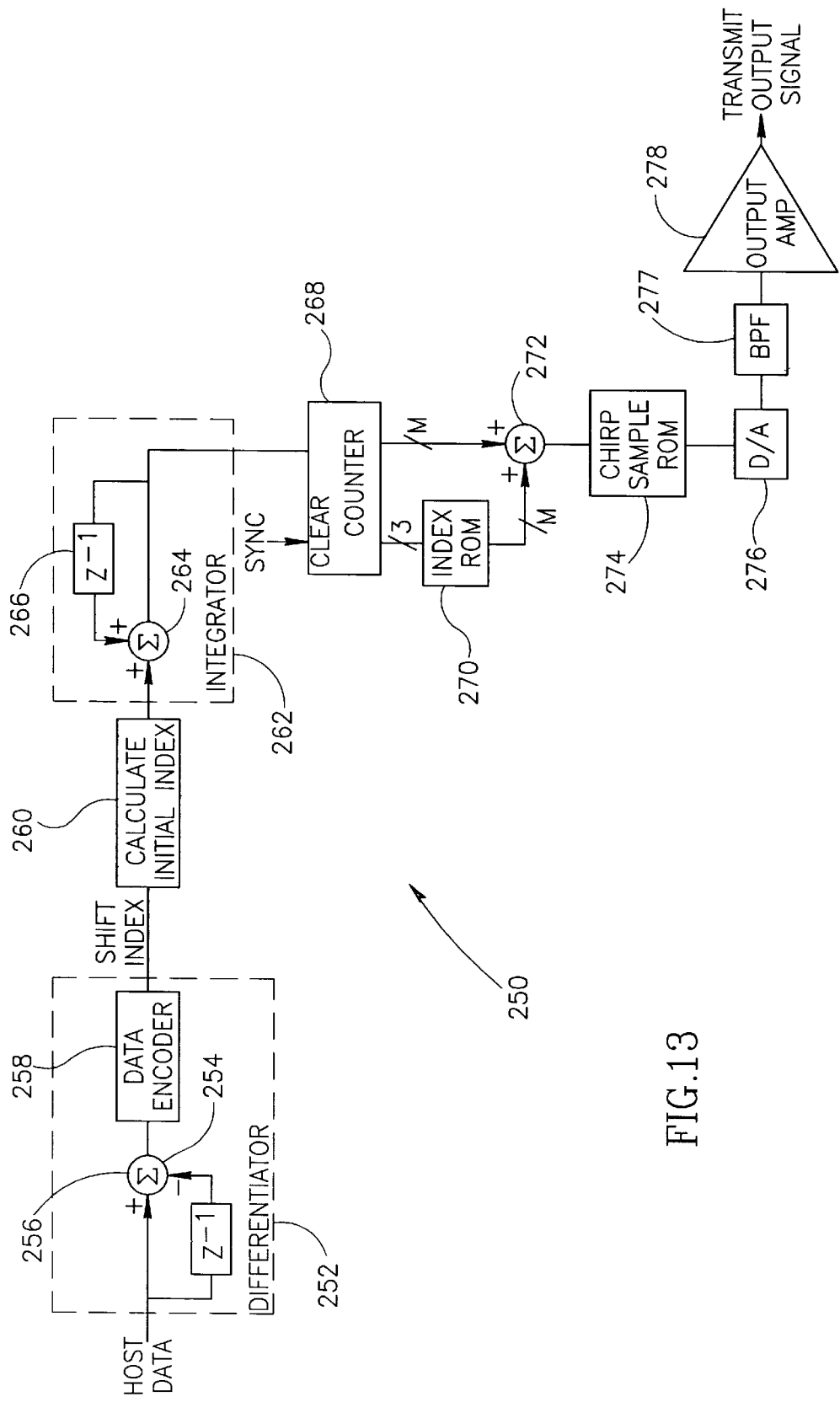
FIG. 13 is a high level diagram illustrating the transmitter portion of a second embodiment of the present invention suitable for transmitting differential data or absolute data having extra non data symbols.

A high level diagram illustrating the transmitter portion of the reliable embodiment of the present invention suitable for transmitting differential data or absolute data having extra non data symbols is shown in FIG. 13. The transmitter, generally referenced 250, of FIG. 13 is similar to that shown FIG. 12, with the exception of the addition of differentiator 252 and integrator 262.

The transmitter 250 shown in FIG. 13 transmits data using an absolute mode of transmission. In this mode, all the symbols, e.g., $2^n$ symbols, are transmitted directly without differentiation or integration. Each five bit symbol is used to directly determine the rotation shift index for each superchirp within a UST. Accordingly, the receiver includes an integrator which functions to integrate the delta shifts generated by the differential data decoder. Alternatively, additional modes of transmission and reception are possible. For example, the transmitter can be used in a differential mode whereby the transmitter integrates the data before it is transmitted, modulo the superchirp length. Accordingly, the receiver must differentiate the receive data in order to properly receive. However, in this case, the integrator is not needed. In another alternative, the data is first differentiated modulo the number of shift indexes in the transmitter, encoded and then integrated before being applied to the chirp sample ROM. Accordingly, the receiver first differentiates the data, decodes the output of the differentiator and finally integrates the output of the decoder to form the output of the receiver.

This last alternative can be used to encode the data symbols ($2^n$ or any other number) in addition to extra symbols not within the set of data symbols. In the five bit example presented here, this would allow a total number of symbols greater than 32 to be transmitted, some of the symbols being non data symbols. To accomplish this, the superchirp symbol time is divided into a number of shift indexes greater than 32 in order to accommodate the extra non data symbols.

To transmit data using a differential mode of transmission the optional differentiator 252 is not required. The host provides data which serves as the shift index to the calculate initial index unit 260. The shift index within the superchirp symbol is calculated and input to integrator 262 which comprises a summer 264 and a delay unit 266. The summer 264 adds modulo $2^n$, i.e., modulo 32. The output of the summer is delayed and added with the output of the calculate initial index unit 260. The output of the integrator is input to the counter 268 which functions similarly to the counter of the transmitter shown in FIG. 12. The chirp sample ROM 274, D/A converter 276, band pass filter 277 and output amplifier 278 function similarly as the corresponding counterparts in the transmitter shown in FIG. 12.

If the transmitter and receiver pair are to be used in a differential mode than integrator 262 is required to integrate the initial index data it is applied to counter 268. In the differential mode, the receiver need only differentiate the shift indexes output by the maximum correlation sum detector. In the case where the symbol set comprises a number of symbols other than $2^n$, differentiator 252 is required. The data from the host enters delay unit 254 and is subtracted from the current data received from the host by summer 256. The output of the summer, which adds modulo the number of data symbols, e.g., 32, is output to data encoder 258. The data encoder maps the $2^n$ data symbols to a particular set of shift indexes. The data encoder is required when the symbol encoding set includes non data symbols. For example, the encoding set may include $2^n$ data symbols in addition to extra non data symbols used for various purposes.

The shift indexes are used to calculate the initial index which is input to the integrator 262. The output of the integrator is delayed by delay unit 266 and added by summer 264 to the initial index. The summer adds the two quantities modulo the length of the superchirp. The counter 268, index ROM 270, adder 272, chirp sample ROM 274, D/A converter 276, filter 277 and output amplifier operate similarly to the corresponding components in the transmitter shown in FIG. 12.

Figure 14A:
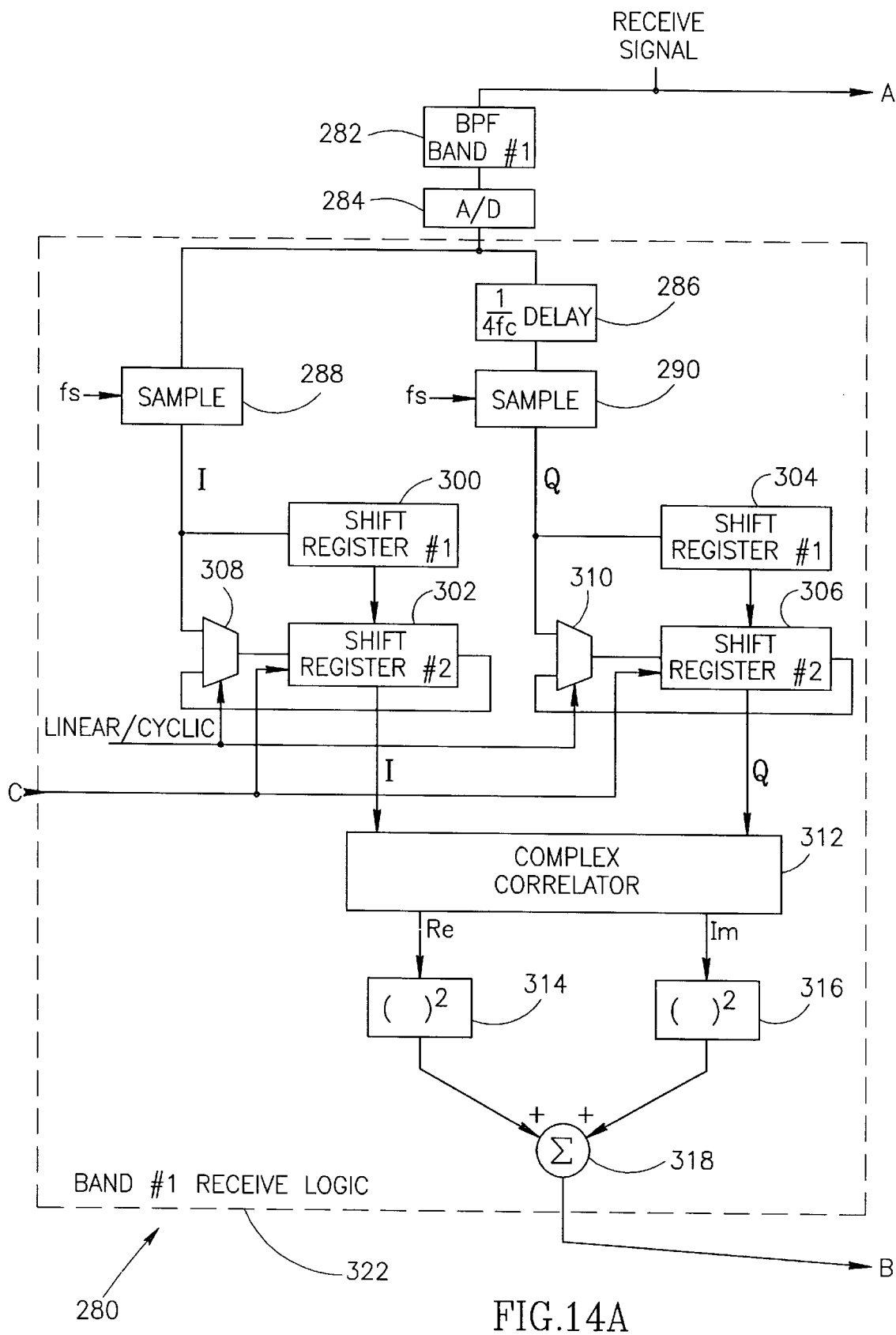
FIGS. 14A, 14B and 14C are high level block diagrams illustrating the receiver portion of a second embodiment of the present invention.
Figure 14B:
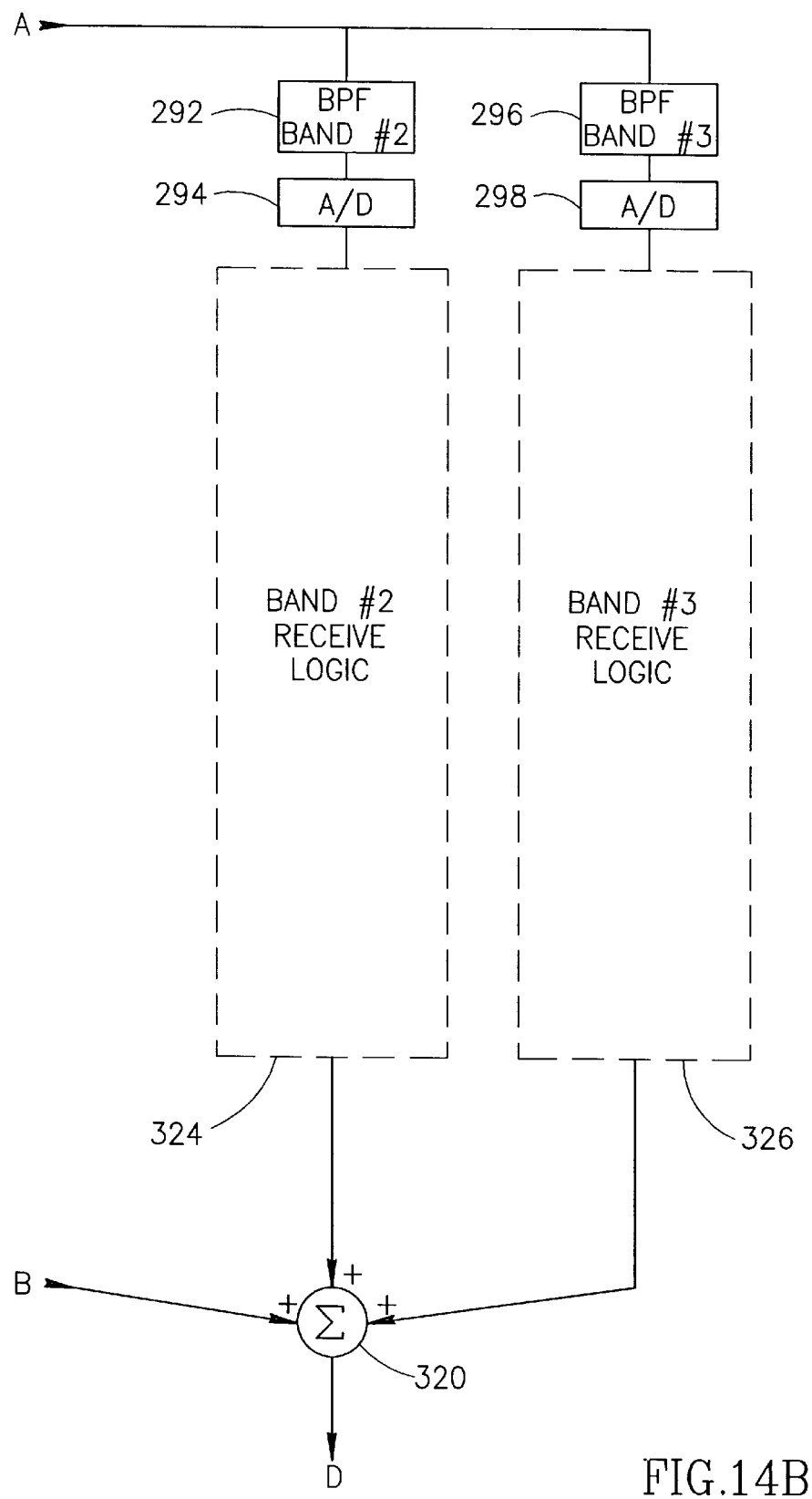
Figure 14C:
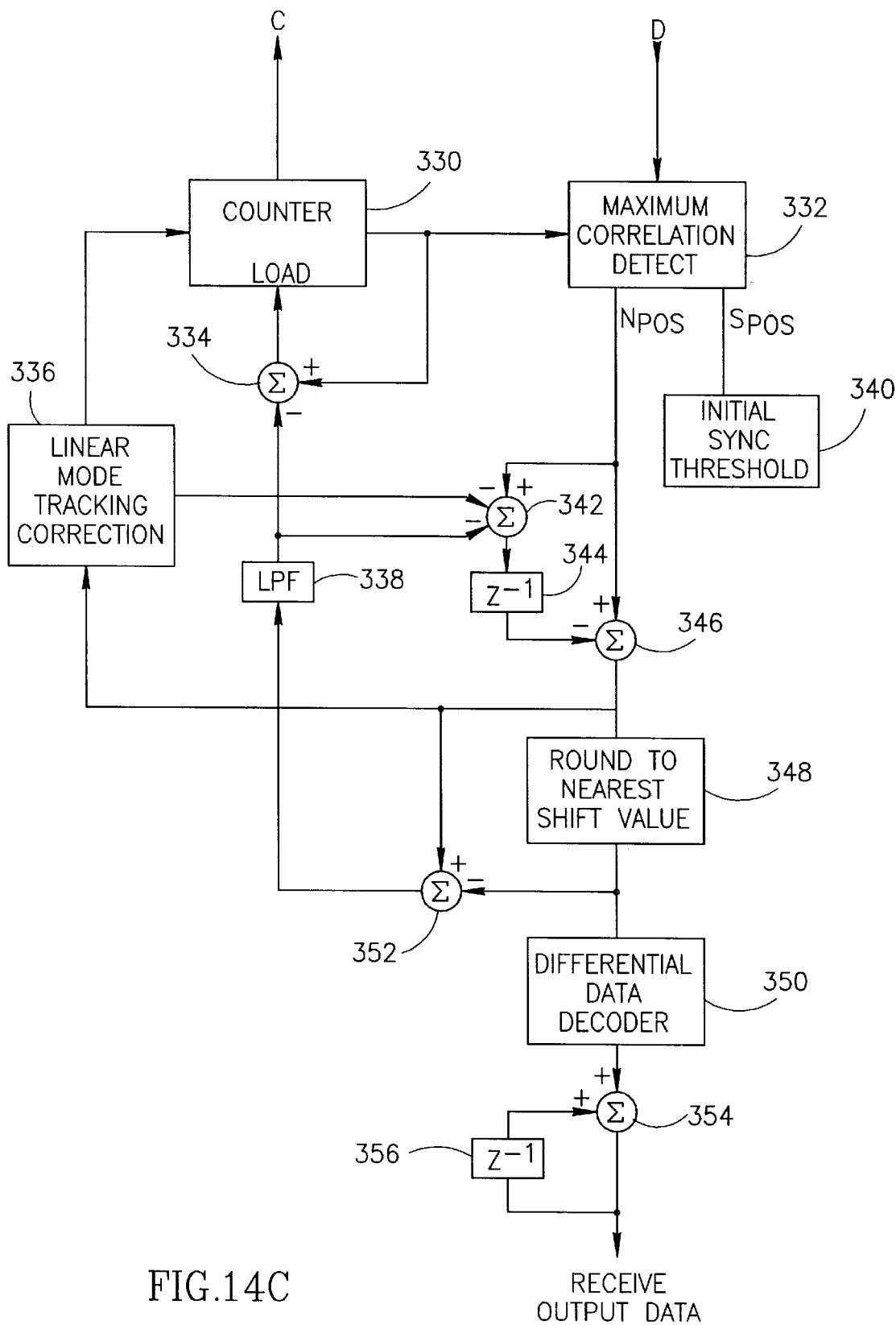

High level block diagrams illustrating the receiver portion of the reliable embodiment of the present invention are shown in FIGS. 14A, 14B and 14C. As described previously, the receiver is split into three pass bands labeled band #1, band #2 and band #3. The received signal is input to band pass filter (BPF) 282 covering the frequency range of band #1, to band pass filter 292 covering the frequency range for band #2 and to band pass filter 296 covering the frequency range for band #3. For a chirp pattern ranging from 100 to 400 KHz band #1 has a pass band from 100 to 200 KHz, band #2 from 200 to 300 KHz and band #3 from 300 to 400 KHz.

Alternative embodiments may use a different number of bands as long as the number of bands is two or greater and in order to achieve an increase and reliability. In the case of three bands, two of the bands can be corrupted with noise and fail to receive and the receiver logic of the remaining band may still be able to output correct data. In addition, the splitting of the received signal to three bands has the advantage of making the receiver more immune to phase distortions. The amount of distortion that each band can handle does not change but the contribution from all three bands working together increases the amount of phase distortion the receiver can handle and still receive properly.

The output of band pass filter 282 for band #1 is input to one bit A/D converter 284. The output of band pass filter 292 for band #2 is input to one bit A/D converter 294. Similarly, the output of band pass filter 296 for band #3 is input to one bit A/D converter 298. The output of each of the one bit A/D converters is input to a receiver sub unit. In particular, the output of each of the one bit A/D converters is input to a receiver sub unit or receiver logic circuit 322, 324, 326 for each of band #1, band #2, band #3, respectively. The receiver logic circuits for each of the bands comprise identical circuitry and therefore only the receive logic circuit for band #1 is shown illustrated in FIG. 14A for clarity sake.

The operation of the receiver of FIGS. 14A, 14B and 14C is similar to that of the receiver shown in FIGS. 7A and 7B with the exception that additional circuitry is added in order to perform complex correlation rather than real correlation. The output of the A/D converter 284 is sampled at the sampling frequency $f_s$ by sampler 288 forming an I data stream. The output of the A/D converter 284 is also sampled at the sampling frequency $f_s$ by sampler 290 after being delayed a period of $$\frac{1}{4f_c}$$

by delay circuit 286. The output of the sampler forms a 90 degree quadrature Q bit stream.

Each of the I and Q data streams are input to a separate set of shift registers. The I bit stream or inphase bit stream is input to shift register #1 300 and one of the two inputs of the multiplexor 308. The output of the multiplexor 308 is input to the serial input of shift register #2 302. The serial output of shift register #2 forms the second input to multiplexer 308.

Similarly, the Q or out of phase bit stream is input to shift register #1 304 and one of the two inputs to multiplexor 310. The output of the multiplexor is input to the serial input of shift register #2 306. The serial output of shift register #2 wraps around and forms the second input of multiplexor 310. A linear/cyclic control signal forms the select input to multiplexors 308, 310. Both sets of shift registers for the I and Q channels operate silarly to those of the receiver shown in FIGS. 7A and 7B.

Note that the size of the sift registers in this embodiment is 256 bits long. Each shift register holds the equivalent of one superchirp or a chirp spanning the length of eight USTs. A 256 bit I value and a 256 bit Q value from shift registers #2 are input to the complex correlator 312. The complex conelator functions to multiply the complex input I+jQ by a complex template $M_i+jM_q$ to yield the following.

$$\begin{aligned}\text{Complex Correlator Output} &= (I+jQ) \times (M_i - jM_q) \\ &= (I \cdot M_i + Q \cdot M_q) + j(-I \cdot M_q + Q \cdot M_i) \\ &= (\text{Re}) + j(\text{Im})\end{aligned}$$

The complex multiplication performed by the correlator results in a real sum and an imaginary sum each nine bits wide. The real correlation sum is then squared by squaring function 314 and the imaginary correlator sum is squared by squaring function 316. The squares of the real and imagi sums are then added by adder 318. The output of adder 318 forms the output of the received logic circuit for band #1. Similarly, the received logic circuitry for bands #2 and #3 generate similar outputs. The three correlation sum outputs are then summed by summer 320. The output of summer 320 is then input to maximum correlation detector 382.

The remainder of the receiver as shown in FIG. 14C operates in similar fashion to the receiver described in connection with the fast embodiment of FIGS. 7A and 7B with the exception that only the positive index and the positive correlator sum are utilized in the reliable embodiment. The index $N_{POS}$ yielding a maximum correlation is input to a differentiator comprising summer 342, delay unit 344 and summer 346. The output of the differential shift index which is within the range of 0 to 255 is rounded to the nearest shift value by rounding function 348. The rounded shift value is then input to the differential data decoder 350 which decodes the shift index value to a value within the original data sample range which in this case is a number within the range 0 to 31. Since the output of the differential decoder is a differential data value it must be integrated before being output by the receiver. An integrator comprising summer 354 and delay unit 356 functions to integrate the differential data value to yield the received output data.

Note that similar to the receiver of the fast embodiment, the I and Q data values can comprises either +1 or −1 which in digital binary may be represented by a single bit, i.e., 0 or 1. In addition, the components of the complex template $M_i$ and $M_q$ can be either +1, −1 or 0. Multiplication by +1 or −1 is performed using an XOR function and multiplication by 0 is performed by not connecting that particular tap in the shift register. Performing multiplication by 0 by eliminating taps in his manner not only improves performance but also saves considerable hardware. This technique requires only approximately a third of the original shift register taps to be connected and subsequently summed up.

The complex template for the complex correlator is computed by first passing the superchirp through each of the band pass filters. The outputs of each of the band pass filters are then sampled to generate the I and Q data steams, Each sample is then quantized to the three levels of +1, −1 and 0. When the absolute value of the sample is below a particular threshold it is quantized to 0. Otherwise, the sign is examined and a positive sign is coded as a '1' and a negative sign becomes '0'. This same technique can be used to generate the template for the receiver shown of FIGS. 7A and 7B.

To further increase the resolution of the receiver, interpolation may be utilized. This can be achieved by placing interpolators at the output of the complex correlator 312 before the real and imaginary output correlation sums are squares The interpolators would effectively double the sampling rate by generating intermediate values. The interpolated values can be calculated by adding each consecutive pair of numbers and multiplying by a suitable constant such as 0.5. Multiplying by 0.625 is useful for achieving an approximation for sinx/x or sine shape for the interpolation function. The outputs of the interpolator are subsequently squared and added.

The use of interpolation permits a lower sampling rate to be used. For example, the sampling rate may be reduced from 320 KHz to 160 KHz if interpolation is used. Correspondingly, the demodulating frequency $f_c$ for each of the three bands can be changed to a multiple of one half the sampling rate $f_s$ or 80 KHz, a more preferred multiple. Thus, the center frequency for band #1 can be 160 KHz, center frequency for band #2 can be 240 KHz and the center frequency for band #3 can be 320 KHz.

The receiver begins operation in a preamble listening mode. The receiver circulates the maximal absolute value of the complex correlation. In addition, the differential shifts and the correlation sum thresholds are also checked. When two consecutive zero shifts are detected, a 'carrier detect' is reported. The sampling window is then synchronized and the cyclic correlator is used to decode the remainder of the packet.

Figure 15:
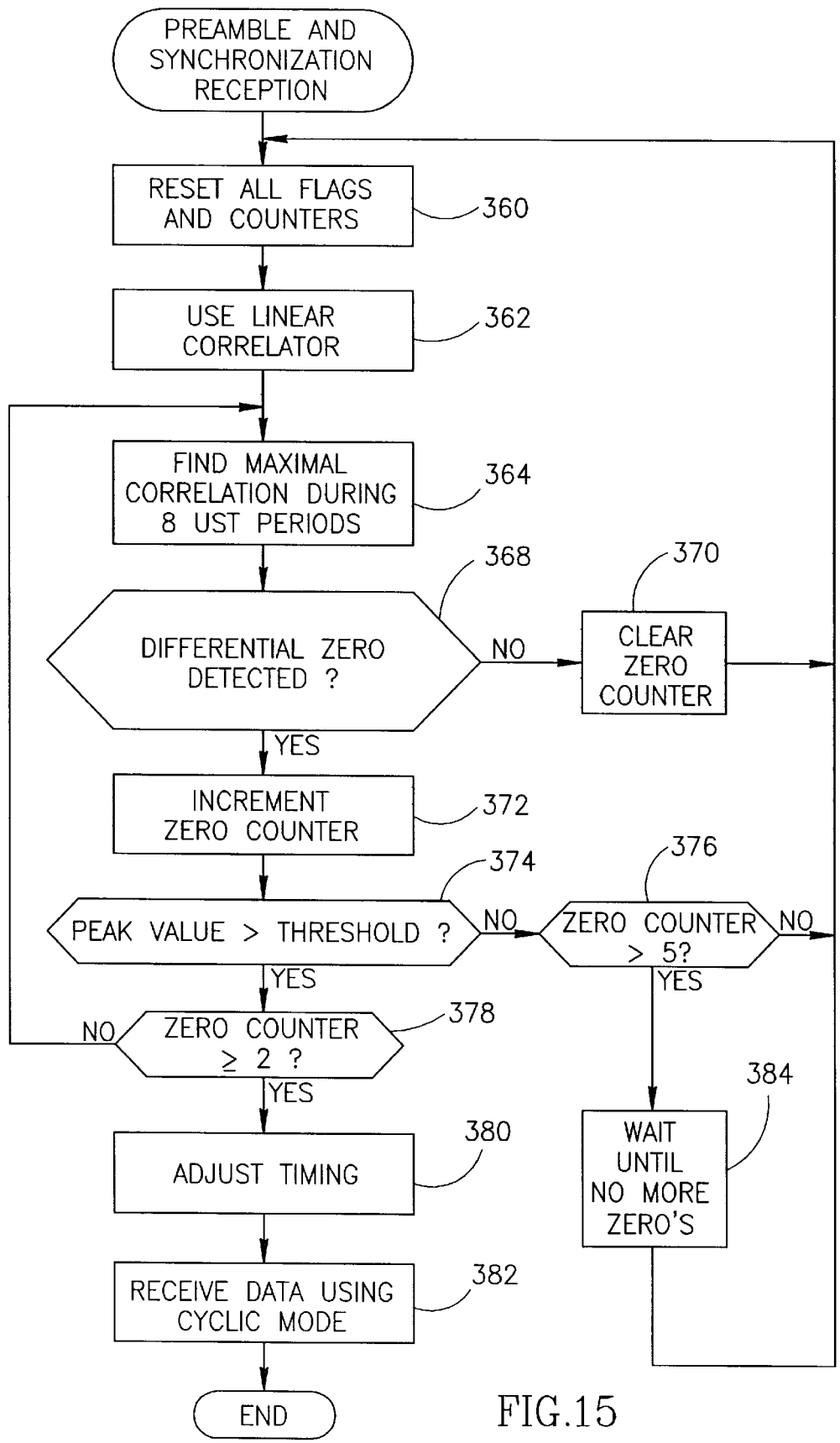
FIG. 15 is a high level flow illustrating the preamble and synchronization reception method of the second embodiment of the present invention.

A high level flow diagram illustrating the preamble and synchronization reception method of the reliable embodiment of the present invention is shown in FIG. 15. Initially, all flags and counters are reset (step 360). The linear mode of operation for the correlator is then set (step 362). Received data bits are sled into shift register #2 until a maximum correlation is found for a superchirp, i.e., 8 USTs (step 364). Once a maximum correlation peak is found, the receiver searches for the next maximum correlation peak. When a differential zero is detected (step 368) a zero counter is incremented (step 372). A differential zero is detected when the absolute value of the difference between consecutive correlation peaks is less than one half of a minimum delta shift, i.e., less than ½(½″)UST, where n is the number of bits per symbol initially, e.g., 3 bits, before the protocol version field is read. It is also checked whether the peak value of the correlation stun is greater than a predetermined threshold (step 374). If the peak value of the correlation sum is greater than the threshold it is checked if the value of the zero counter is greater than or equal to two (step 378). If the zero counter value is greater than or equal to two, the linear mode tracking is then corrected using the linear mode tracking correction circuit 336 of FIG. 14C (step 380). Reception of the remainder of the packet then continues using the cyclic mode of reception (step 382). If the peak value of the correlation sum is not greater than the threshold, it is determined whether the value of the zero counter is greater than five (step 376). If not, control passes to step 360 and the process starts over. If it is greater than five, the receiver continues to receive until nor more zeros are received (step 384).

If in step 368, the difference between consecutive correlation peaks is greater than or equal to one half of a bit time, the zero counter is cleared (step 370) and control passes to step 360.

Figure 16:
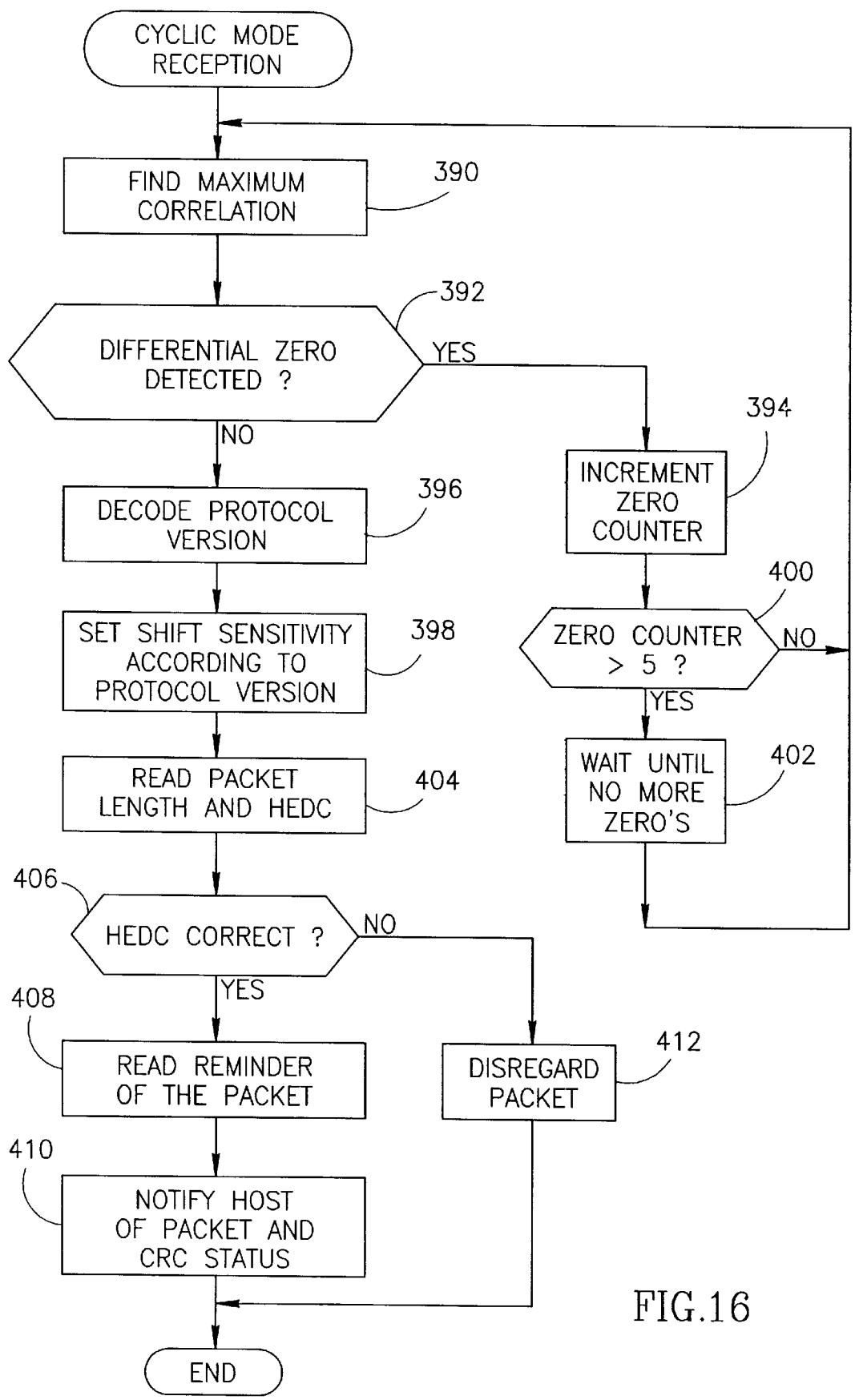
FIG. 16 is a high level flow diagram illustrating the cyclic mode reception method of the second embodiment of the present invention.

A high level floating diagram illustrating the cyclic mode reception method of the reliable embodiment of the present invention, used to receive the remainder of the packet, is shown in FIG. 16. In the first step, the correlation peak is found for each bit within the superchirp, i.e., 256 shifts of shift registers #2 302, 306 (FIG. 14C) (step 390). If s differential zero is detected (step 392) then the zero counter is incremented by one (step 394). A differential zero is detected when the absolute value of the previous maximum correlation peak subtracted from the current correlation peak is less than one half of a bit time, i.e., less than ½(½ⁿ)UST, where n is the number of bits per symbol initially, e.g., 3 bits, before the protocol version field is read. If the value of the zero counter is not greater than five, then control returns to step 390 and the receiver searches for the next maximum correlation peak (step 400). If the value of the zero counter is greater than five then the receiver waits until no more zeros are received and control returns to step 390 (step 402).

If the absolute value of the difference between two correlation peaks is not within one half a minimum delta time then the protocol version field of the packet is then decoded (step 396). As described previously, the start of packet (SOP) field contains four identical symbols which preferably are non rotated superchirp having zero shift. The receiver decodes these symbols differentially as zeros. Detection of a non zero delta shift indicates the start of the protocol version field since the protocol version field is a single symbol of non zero shift. Once the protocol version is decoded, the shift sensitivity is set according thereto (step 398).

Next, the packet length and the header error detection code (HEDC) are then read (step 404). If the header error detection code is correct (step 406), the remainder of the packet is then read (step 408). If the header error detection code is not correct then the packet is disregarded (step 412). Once the remainder of the packet is read (step 408) notification is provided of the end of packet and the status of the CRC check (step 412).

While the invention has been described with respect to a limited number of embodiments, it will be appreciated that many variations, modifications and other applications of the invention may be made.

What is claimed is:

1. A method of communication over a communications channel from a transmitter to a receiver both connected to the communications channel, said method comprising the steps of:

generating a plurality of symbols at the transmitter, each symbol constructed from a spreading waveform circularly shifted by an amount in accordance with the data to be conveyed by said symbol;

generating a transmission signal in accordance with said plurality of symbols;

transmitting said transmission signal onto the communications channel;

receiving said transmission signal from the communications channel at the receiver and generating a receive signal therefrom;

decoding said receive signal at the receiver by circularly shifting said received signal wherein for each circular shift, the received signal is correlated with a template corresponding to the spreading waveform so as to generate a correlation sum therefrom; and determining receive data in accordance with the shift corresponding to the maximum correlation sum.

2. A method of communication over a communications channel from a transmitter to a receiver both connected to the communications channel, said method comprising the steps of:

generating a plurality of symbols at the transmitter, each symbol constructed from a spreading waveform circularly shifted by an amount in accordance with the data to be conveyed by said symbol;

generating a transmission signal in accordance with said plurality of symbols for transmission over said communications channel;

receiving said transmission signal from the communications channel at the receiver and generating a receive signal therefrom; and decoding said received signal at the receiver by correlating the received signal with a template corresponding to the spreading waveform so as to generate a differential shift index representing the time shift between consecutive circular shifts of the spreading waveform.

3. The method according to claims 1 or 2, wherein said spreading waveform comprises a chirp waveform.

4. The method according to claims 1 or 2, wherein said spreading waveform comprises a superchirp waveform constructed from a plurality of individual chirps.

5. The method according to claim 2, wherein said step of decoding comprises the steps of:

circularly shifting each received symbol;

for each circular shift of the received symbol, correlating the received symbol with the template corresponding to the spreading waveform so as to generate a correlation sum;

generating a shift index corresponding to a maximum correlation sum; and decoding the shift index to yield the original transmitted data.

6. The method according to claim 2, wherein said step of decoding comprises the steps of:

circularly shifting each received symbol;

for each circular shift of the received symbol, correlating the received symbol with the template corresponding to the spreading waveform;

generating a first shift index and a second shift index corresponding to a positive correlation sum and a negative correlation sum, respectively;

decoding said first shift index and said second shift index to yield a first data output and a second data output, receptively; and outputting either said first shift index or said second shift index based on a maximum of said positive correlation sum and said negative correlation sum.

7. A spread spectrum communications system for communication over a communication channel, comprising:

a transmitter coupled to the communication channel, said transmitter for generating a plurality of symbols, each symbol constructed utilizing a spreading waveform circularly shifted by an amount in accordance with the data to be conveyed by said symbol; and a receiver coupled to the communication channel, said receiver for receiving a signal from the communications channel and for decoding said plurality of symbols by circularly shifting said received signal wherein for each circular shift, the received signal is correlated with a template corresponding to the spreading waveform so as to generate correlation sum therefrom, determining receive data in accordance with the shift corresponding to the maximum correlation sum.

8. The system according to claim 7, wherein said spreading waveform comprises a chirp waveform.

9. The system according to claim 8, wherein said spreading waveform comprises a superchirp waveform constructed from a plurality of individual chirps.

10. A method of generating a signal for transmission over a communications channel from an input bit stream and utilizing a spreading waveform, said method comprising the steps of:

forming a serial stream of shift indexes from the input bit stream;

determining an initial index in accordance with each shift index within said serial stream of shift indexes;

circularly shifting the spreading waveform in accordance with the initial index; and transmitting the circularly shifted spreading waveform onto the communication channel.

11. A method of generating a spread spectrum signal for transmission over a communications channel from an input bit stream and utilizing a spreading waveform, said method comprising the steps of:

forming a shift index from the input bit stream;

determining an initial index in accordance with the following equation:

$$\text{initial index} = \left[ \frac{\text{spreading waveform length}}{\text{total number of symbols}} \right] \cdot \text{shift index};$$

circularly shifting the spreading waveform in accordance with the initial index; and transmitting the circularly shifted spreading waveform onto the communication channel.

12. The method according to claim 11, wherein said spreading waveform comprises a chirp waveform.

13. The method according to claims 11 or 12, wherein said spreading waveform comprises a superchirp waveform constructed from a plurality of individual chirps.

14. The method according to claim 11 or 12, further comprising the step of differentiating the input bit stream to yield a differential shift index.

15. A transmitter for generating a signal for transmission over a communications channel from an input bit stream and utilizing a spreading waveform, comprising:

means for forming a shift index from each group of n bits in the input in bit stream;

means for determining an initial index in accordance with the shift index;

means for circularly shifting the spreading waveform in accordance with the initial index; and means for transmitting the circularly shifted spreading waveform over the communication channel.

16. The transmitter according to claim 15, wherein said spreading waveform comprises a chirp waveform.

17. The transmitter according to claim 15, wherein said spreading waveform comprises a superchirp waveforn constructed from a plurality of individual chirps.

18. The transmitter according to claim 15, wherein said means for circularly shifting the spreading waveform comprises:

counting means adapted to receive the initial index; and look up table means for outputting sample points of the spreading waveform corresponding to the output of said counting means.

19. The transmitter according to claim 15, further comprising a differentiator for differentiating the input bit stream to yield a differential shift index.

20. A receiver coupled to a communications channel for receiving a plurality of symbols, each symbol consisting of a spreading waveform circularly rotated by an amount in accordance with the data to be transmitted during a particular symbol time, said receiver comprising:

sampling means for sampling a receive input signal;

shift means for circularly rotating the output of said sampling means, said shift means having a plurality of taps;

correlation means coupled to said plurality of taps of said shift means, said correlation means generating a correlation sum for each circular shift of said shift means utilizing a template corresponding to the spreading waveform, said correlation means generating a plurality of correlation sums for each received symbol;

maximum correlation detection means for determining a maximum correlation sum from said plurality of correlation sums; and a data decoder for decoding a shift index associated with said maximum correlation sum and generating an output therefrom.

21. A receiver coupled to a communications channel for receiving data encoded as a plurality of symbols, each symbol transmitted utilizing a spreading waveform, said receiver comprising:

signal splitting means for dividing a receive input signal into a plurality of frequency bands, said signal splitting means outputting a plurality of band pass signals, each band pass signal associated with a single frequency band;

sampling means for sampling said plurality of band pass signals;

correlation means for correlating the output of said sampling means for each frequency band, said correlation means generating a plurality of band correlation sums for each frequency band;

summing means for summing each plurality of band correlation sums to yield a plurality of correlation sums;

maximum correlation detection means for determining a maximum correlation sum from said plurality of correlation sums; and data decoding means for decoding the received symbols utilizing said maximum correlation sum and generating an output therefrom.

22. A receiver coupled to a communications channel for receiving data encoded as a plurality of symbols, each symbol consisting of a spreading waveform circularly rotated by an amount in accordance with the data to be transmitted during a particular symbol time, said receiver comprising:

signal splitting means for dividing a receive input signal into a plurality of frequency bands, said signal splitting means outputting a plurality of band pass signals, each band pass signal associated with a single frequency band;

a plurality of sampling means for sampling said plurality of band pass signals;

a plurality of shift means for circularly rotating the output of each sampling means associated with each frequency band, each shift means having a plurality of taps;

a plurality of correlation means, each correlation means coupled to the output of one of said shift means, said correlation means generating a correlation sum for each circular shift of said shift means utilizing a template corresponding to the spreading waveform, each correlation means generating a plurality of band correlation sums for each received symbol;

summing means for summing each plurality of band correlation sums output by each correlation means so as to generate a plurality of correlation sums;

maximum correlation detection means for determining a maximum correlation sum from said plurality of correlation sums; and a data decoder for decoding a shift index associated with said maximum correlation sum and generating an output therefrom.

23. The receiver according to claims 20, 21 or 22, wherein said spreading waveform comprises a chirp waveform.

24. The receiver according to claims 20, 21 or 22, wherein said spreading waveform comprises a superchirp waveform constructed from a plurality of individual chirps.

25. The receiver according to claims 20, 21 or 22, further comprising means for synchronizing said correlation means to a symbol time.

26. The receiver according to claims 20, 21 or 22, further comprising a differentiator coupled to the output of said maximum correlation detection means, said differentiator for generating a differential shift index corresponding to the time difference between two consecutive circularly rotated spreading waveforms.

27. The receiver according to claims 20, 21 or 22, further comprising an integrator coupled to the output of said data decoder, said integrator for integrating the output of said data decoder.

28. The receiver according to claims 21 or 22, wherein said signal splitting means comprises a plurality of band pass filters, each band pass filter having a bandwidth and center frequency according to its frequency band.

29. The receiver according to claims 20, 21 or 22, wherein said sampling means comprises a one bit analog to digital converter.

30. The receiver according to claims 20, 21 or 22, wherein said sampling means comprises a comparator and a sample circuit.

31. The receiver according to claims 20, 21 or 22, wherein said sampling means comprises means for generating both an I or inphase data stream and a Q or quadrature data stream, wherein said Q data stream is delayed in time with respect to said I data stream by a predetermined amount.

32. The receiver according to claims 20, 21 or 22, wherein said correlation means comprises complex correlation means.

33. The receiver according to claim 32, wherein said complex correlation means comprises means for applying a non linear function to the results of said complex correlation.

34. The receiver according to claim 33, wherein said non linear function comprises a squaring function.

35. The receiver according to claims 20 or 22, wherein said shift means comprises circular shift means.

36. The receiver according to claim 20, 21 or 22, further comprising tracking means for maintaining alignment of said correlation means to a symbol time.

37. A method of receiving data that is encoded as a plurality of symbols and transmitted over a communications channel, each symbol transmitted utilizing a spreading waveform, said method comprising the steps of:

dividing a receive input signal into a plurality of frequency bands, generating a plurality of band pass signals, each band pass signal associated with a single frequency band;

sampling said plurality of band pass signals to yield a sample stream;

correlating said sample stream associated with each frequency band so as to generate a plurality of band correlation sums therefrom;

summing each plurality of band correlation sums so as to generate a plurality of correlation sums;

determining a maximum correlation sum from said plurality of correlation sums; and decoding a shift index for each received symbol utilizing said maximum correlation sum and generating an output therefrom.

38. A method of receiving data encoded as a plurality of symbols and transmitted over a communication channel, each symbol consisting of a spreading waveform circularly rotated by an amount in accordance with the data to be transmitted during a particular symbol time, said method comprising the steps of:

dividing a receive input signal into a plurality of frequency bands, generating a plurality of band pass signals, each band pass signal associated with a single frequency band;

sampling said plurality of band pass signals to yield a sample stream;

circularly rotating said sample stream of each frequency band;

correlating the circularly rotated sample stream for each frequency band utilizing a template corresponding to the spreading waveform, generating a band correlation sum for each circular rotation to yield a plurality of band correlation sums for each symbol;

summing said plurality of band correlation sums for each frequency band so as to generate a plurality of correlation sums;

determining a maximum correlation sum from said plurality of correlation sums; and decoding a shift index associated with said maximum correlation sum and generating an output therefrom.

39. The method according to claims 37 or 38, wherein said spreading waveform comprises a chirp waveform.

40. The method according to claims 37 or 38, wherein said spreading waveform comprises a superchirp waveform constructed from a plurality of individual chirps.

41. The method according to claims 37 or 38, further comprising the step of synchronizing said correlation to a symbol time.

42. The method according to claims 37 or 38, further comprising the step of differentiating said shift index to yield a differential shift index corresponding to the time difference between two consecutive circularly rotated spreading waveforms.

43. The method according to claims 37 or 38, further comprising the step of integrating the output of the step of decoding.

44. The method according to claims 37 or 38, wherein said step of dividing comprises the step of band pass filtering each frequency band with a bandwidth and center frequency according to each frequency band.

45. The method according to claims 37 or 38, wherein said step of sampling comprises the step of providing and applying a one bit analog to digital converter to each pass band signal.

46. The method according to claims 37 or 38, wherein said step of sampling comprises the step of providing and applying a comparator and a sample circuit to each pass band signal.

47. The method according to claims 37 or 38, wherein said step of sampling means comprises the step of generating both an I or inphase data stream and a Q or quadrature data stream, wherein said Q data stream is delayed in time with respect to said I data stream by a predetermined amount.

48. The method according to claims 37 or 38, wherein said step of correlating comprises applying a complex correlation to said sample stream.

49. The method according to claim 48, wherein said step of applying a complex correlation comprises the step of applying a non linear function to the results of said complex correlation.

50. The method according to claim 49, wherein said non linear function comprises a squaring function.

51. The receiver according to claims 37 or 38, the comprising the step of maintaining alignment of said correlation to a symbol time.

52. In a spread spectrum communications system for communication over a communications channel, including a transmitter and a receiver both connected to the communications channel, a method for synchronizing the receiver, said method comprising the steps of:

transmitting a plurality of spreading waveforms onto said communications channel, said plurality of spreading waveforms having zero differential shift with respect to each other;

receiving said plurality of spreading waveforms from said communications channel so as to generate a receive signal; and decoding said receive signal and declaring synchronization upon receiving a minimum of a predetermined number of spreading waveforms having zero differential shift between them.

53. The method according to claim 52, wherein said spreading waveform comprises a chirp waveform.

54. The method according to claim 52, wherein said spreading waveform comprises a superchirp waveform constructed from a plurality of individual chirps.

55. The method according to claim 52, wherein each spreading waveform has zero rotational shift.

* * * * *